United States Patent
Markham et al.

(10) Patent No.: US 11,057,213 B2
(45) Date of Patent: Jul. 6, 2021

(54) AUTHENTICATION SYSTEM FOR ELECTRONIC CONTROL UNIT ON A BUS

(71) Applicant: GARRETT TRANSPORTATION I INC., Torrance, CA (US)

(72) Inventors: Thomas R. Markham, Fridley, MN (US); Alexander Chernoguzov, Warrington, PA (US)

(73) Assignee: GARRETT TRANSPORTATION I, INC., Torrance, CA (US)

( * ) Notice: Subject to any disclaimer, the term of this patent is extended or adjusted under 35 U.S.C. 154(b) by 184 days.

(21) Appl. No.: 15/784,044

(22) Filed: Oct. 13, 2017

(65) Prior Publication Data
US 2019/0116045 A1    Apr. 18, 2019

(51) Int. Cl.
*H04L 29/06* (2006.01)
*H04L 12/40* (2006.01)
(Continued)

(52) U.S. Cl.
CPC ........ *H04L 9/3234* (2013.01); *G06F 13/4282* (2013.01); *H04L 1/0061* (2013.01);
(Continued)

(58) Field of Classification Search
CPC . H04L 9/3234; H04L 63/0876; H04L 63/101; H04L 2012/40215;
(Continued)

(56) References Cited

U.S. PATENT DOCUMENTS 3,744,461 A    7/1973    Davis
4,005,578 A    2/1977    McInerney
(Continued)

FOREIGN PATENT DOCUMENTS

CN    102063561 A    5/2011
CN    102331350 A    1/2012
(Continued)

OTHER PUBLICATIONS

Litichever, Gil et al. U.S. Appl. No. 62/195,419 (Specification). Available at least Jan. 26, 2017. (Year: 2017).*
(Continued)

*Primary Examiner* — Michael Simitoski
(74) *Attorney, Agent, or Firm* — Seager, Tufte & Wickhem, LLP

(57) ABSTRACT

An authentication system having a communications bus, a transmitter connected to the bus, and a receiver connected to the bus. A physical layer signal may be applied by the transmitter to a message on the bus for authenticating the transmitter. The physical layer signal may incorporate an identifier (ID) of the transmitter. The receiver may receive the message and decode the physical layer signal on the message. Decoding the physical layer signal on the message may reveal the ID of the transmitter sending the message. The receiver may look up the ID on a list of IDs corresponding to transmitters approved to send the message, to determine whether the ID of the transmitter sending the message matches an ID on the list. Only if the ID of the transmitter matches an ID on the list, then the transmitter may be authenticated and authorized to send the message.

18 Claims, 16 Drawing Sheets

(51) Int. Cl.
*G06F 21/44* (2013.01)
*H04L 9/32* (2006.01)
*G06F 13/42* (2006.01)
*H04L 1/00* (2006.01)
*G06F 21/55* (2013.01)

(52) U.S. Cl.
CPC .. H04L 12/40019 (2013.01); H04L 12/40104 (2013.01); H04L 63/06 (2013.01); H04L 63/0876 (2013.01); H04L 63/101 (2013.01); H04L 63/123 (2013.01); H04L 63/1416 (2013.01); H04L 63/164 (2013.01); H04L 63/20 (2013.01); *H04L 2012/40215* (2013.01)

(58) Field of Classification Search
CPC ......... H04L 12/40104; H04L 12/40019; H04L 63/1416; H04L 63/06; H04L 63/123; H04L 63/164; H04L 63/20; H04L 1/0061; G06F 13/4282; G05B 23/0213
See application file for complete search history.

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamel et al. |
| 4,671,235 A | 6/1987 | Hosaka |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa et al. |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,917,405 A | 6/1999 | Joao |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong et al. |
| 6,048,628 A | 4/2000 | Hilman et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,351 B1 | 11/2001 | Chutorash |
| 6,314,662 B1 | 11/2001 | Ellis, III |
| 6,314,724 B1 | 11/2001 | Kakuyama et al. |
| 6,321,538 B2 | 11/2001 | Hasler et al. |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,203 B1 | 5/2002 | Jordan et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 9/2002 | Zhao et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,542,076 B1 | 4/2003 | Joao |

(56) References Cited

U.S. PATENT DOCUMENTS

| | | |
|---|---|---|
| 6,546,329 B2 | 4/2003 | Bellinger |
| 6,549,130 B1 | 4/2003 | Joao |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,596 B2 | 12/2003 | Kawashima et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Sumilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,837,042 B2 | 1/2005 | Colignon et al. |
| 6,839,637 B2 | 1/2005 | Moteki et al. |
| 6,849,030 B2 | 2/2005 | Yamamoto et al. |
| 6,857,264 B2 | 2/2005 | Ament |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,990,401 B2 | 1/2006 | Neiss et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,050,863 B2 | 5/2006 | Mehta et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,067,319 B2 | 6/2006 | Wills et al. |
| 7,069,903 B2 | 7/2006 | Sumilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Sumilla |
| 7,111,455 B2 | 9/2006 | Okugawa et al. |
| 7,113,835 B2 | 9/2006 | Boyen et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,164,800 B2 | 1/2007 | Sun |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,277,010 B2 | 10/2007 | Joao |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,383,118 B2 | 6/2008 | Imai et al. |
| 7,389,773 B2 | 6/2008 | Stewart et al. |
| 7,392,129 B2 | 6/2008 | Hill et al. |

(56) References Cited

U.S. PATENT DOCUMENTS

| | | | |
|---|---|---|---|
| 7,397,363 | B2 | 7/2008 | Joao |
| 7,398,082 | B2 | 7/2008 | Schwinke et al. |
| 7,398,149 | B2 | 7/2008 | Ueno et al. |
| 7,400,933 | B2 | 7/2008 | Rawlings et al. |
| 7,400,967 | B2 | 7/2008 | Ueno et al. |
| 7,413,583 | B2 | 8/2008 | Langer et al. |
| 7,415,389 | B2 | 8/2008 | Stewart et al. |
| 7,418,372 | B2 | 8/2008 | Nishira et al. |
| 7,430,854 | B2 | 10/2008 | Yasui et al. |
| 7,433,743 | B2 | 10/2008 | Pistikopoulos et al. |
| 7,444,191 | B2 | 10/2008 | Caldwell et al. |
| 7,444,193 | B2 | 10/2008 | Cutler |
| 7,447,554 | B2 | 11/2008 | Cutler |
| 7,467,614 | B2 | 12/2008 | Stewart et al. |
| 7,469,177 | B2 | 12/2008 | Samad et al. |
| 7,474,953 | B2 | 1/2009 | Hulser et al. |
| 7,493,236 | B1 | 2/2009 | Mock et al. |
| 7,505,879 | B2 | 3/2009 | Tomoyasu et al. |
| 7,505,882 | B2 | 3/2009 | Jenny et al. |
| 7,515,975 | B2 | 4/2009 | Stewart |
| 7,522,963 | B2 | 4/2009 | Boyden et al. |
| 7,536,232 | B2 | 5/2009 | Boyden et al. |
| 7,577,483 | B2 | 8/2009 | Fan et al. |
| 7,587,253 | B2 | 9/2009 | Rawlings et al. |
| 7,591,135 | B2 | 9/2009 | Stewart |
| 7,599,749 | B2 | 10/2009 | Sayyarrodsari et al. |
| 7,599,750 | B2 | 10/2009 | Piche |
| 7,603,185 | B2 | 10/2009 | Stewart et al. |
| 7,603,226 | B2 | 10/2009 | Henein |
| 7,627,843 | B2 | 12/2009 | Dozorets et al. |
| 7,630,868 | B2 | 12/2009 | Turner et al. |
| 7,634,323 | B2 | 12/2009 | Vermillion et al. |
| 7,634,417 | B2 | 12/2009 | Boyden et al. |
| 7,650,780 | B2 | 1/2010 | Hall |
| 7,668,704 | B2 | 2/2010 | Perchanok et al. |
| 7,676,318 | B2 | 3/2010 | Allain |
| 7,698,004 | B2 | 4/2010 | Boyden et al. |
| 7,702,519 | B2 | 4/2010 | Boyden et al. |
| 7,712,139 | B2 | 5/2010 | Westendorf et al. |
| 7,721,030 | B2 | 5/2010 | Fuehrer et al. |
| 7,725,199 | B2 | 5/2010 | Brackney et al. |
| 7,734,291 | B2 | 6/2010 | Mazzara, Jr. |
| 7,738,975 | B2 | 6/2010 | Denison et al. |
| 7,743,606 | B2 | 6/2010 | Havelena et al. |
| 7,748,217 | B2 | 7/2010 | Muller |
| 7,752,840 | B2 | 7/2010 | Stewart |
| 7,765,792 | B2 | 8/2010 | Rhodes et al. |
| 7,779,680 | B2 | 8/2010 | Sasaki et al. |
| 7,793,489 | B2 | 9/2010 | Wang et al. |
| 7,798,938 | B2 | 9/2010 | Matsubara et al. |
| 7,808,371 | B2 | 10/2010 | Blanchet et al. |
| 7,813,884 | B2 | 10/2010 | Chu et al. |
| 7,826,909 | B2 | 11/2010 | Attarwala |
| 7,831,318 | B2 | 11/2010 | Bartee et al. |
| 7,840,287 | B2 | 11/2010 | Wojsznis et al. |
| 7,844,351 | B2 | 11/2010 | Piche |
| 7,844,352 | B2 | 11/2010 | Vouzis et al. |
| 7,846,299 | B2 | 12/2010 | Backstrom et al. |
| 7,850,104 | B2 | 12/2010 | Havlena et al. |
| 7,856,966 | B2 | 12/2010 | Saitoh |
| 7,860,586 | B2 | 12/2010 | Boyden et al. |
| 7,861,518 | B2 | 1/2011 | Federle |
| 7,862,771 | B2 | 1/2011 | Boyden et al. |
| 7,877,239 | B2 | 1/2011 | Grichnik et al. |
| 7,878,178 | B2 | 2/2011 | Stewart et al. |
| 7,891,669 | B2 | 2/2011 | Araujo et al. |
| 7,904,280 | B2 | 3/2011 | Wood |
| 7,905,103 | B2 | 3/2011 | Larsen et al. |
| 7,907,769 | B2 | 3/2011 | Sammak et al. |
| 7,925,399 | B2 | 4/2011 | Comeau |
| 7,930,044 | B2 | 4/2011 | Attarwala |
| 7,933,849 | B2 | 4/2011 | Bartee et al. |
| 7,958,730 | B2 | 6/2011 | Stewart et al. |
| 7,970,482 | B2 | 6/2011 | Srinivasan et al. |
| 7,987,145 | B2 | 7/2011 | Baramov |
| 7,996,140 | B2 | 8/2011 | Stewart et al. |
| 8,001,767 | B2 | 8/2011 | Kakuya et al. |
| 8,019,911 | B2 | 9/2011 | Dressler et al. |
| 8,025,167 | B2 | 9/2011 | Schneider et al. |
| 8,032,235 | B2 | 10/2011 | Sayyar-Rodsari |
| 8,046,089 | B2 | 10/2011 | Renfro et al. |
| 8,046,090 | B2 | 10/2011 | MacArthur et al. |
| 8,060,290 | B2 | 11/2011 | Stewart et al. |
| 8,078,291 | B2 | 12/2011 | Pekar et al. |
| 8,108,790 | B2 | 1/2012 | Morrison, Jr. et al. |
| 8,109,255 | B2 | 2/2012 | Stewart et al. |
| 8,121,818 | B2 | 2/2012 | Gorinevsky |
| 8,145,329 | B2 | 3/2012 | Pekar et al. |
| 8,146,850 | B2 | 4/2012 | Havlena et al. |
| 8,157,035 | B2 | 4/2012 | Whitney et al. |
| 8,185,217 | B2 | 5/2012 | Thiele |
| 8,197,753 | B2 | 6/2012 | Boyden et al. |
| 8,200,346 | B2 | 6/2012 | Thiele |
| 8,209,963 | B2 | 7/2012 | Kesse et al. |
| 8,213,321 | B2 * | 7/2012 | Butts .......... H04L 41/0659 370/242 |
| 8,229,163 | B2 | 7/2012 | Coleman et al. |
| 8,245,501 | B2 | 8/2012 | He et al. |
| 8,246,508 | B2 | 8/2012 | Matsubara et al. |
| 8,265,854 | B2 | 9/2012 | Stewart et al. |
| 8,281,572 | B2 | 10/2012 | Chi et al. |
| 8,295,951 | B2 | 10/2012 | Crisalle et al. |
| 8,311,653 | B2 | 11/2012 | Zhan et al. |
| 8,312,860 | B2 | 11/2012 | Yun et al. |
| 8,316,235 | B2 | 11/2012 | Boehl et al. |
| 8,360,040 | B2 | 1/2013 | Stewart et al. |
| 8,370,052 | B2 | 2/2013 | Lin et al. |
| 8,379,267 | B2 | 2/2013 | Mestha et al. |
| 8,396,644 | B2 | 3/2013 | Kabashima et al. |
| 8,402,268 | B2 | 3/2013 | Dierickx |
| 8,418,441 | B2 | 4/2013 | He et al. |
| 8,453,431 | B2 | 6/2013 | Wang et al. |
| 8,473,079 | B2 | 6/2013 | Havlena |
| 8,478,506 | B2 | 7/2013 | Grichnik et al. |
| RE44,452 | E | 8/2013 | Stewart et al. |
| 8,504,175 | B2 | 8/2013 | Pekar et al. |
| 8,505,278 | B2 | 8/2013 | Farrell et al. |
| 8,543,170 | B2 | 9/2013 | Mazzara, Jr. et al. |
| 8,555,613 | B2 | 10/2013 | Wang et al. |
| 8,571,689 | B2 | 10/2013 | Macharia et al. |
| 8,596,045 | B2 | 12/2013 | Tuomivaara et al. |
| 8,620,461 | B2 | 12/2013 | Kihas |
| 8,634,940 | B2 | 1/2014 | Macharia et al. |
| 8,639,925 | B2 | 1/2014 | Schuetze |
| 8,649,884 | B2 | 2/2014 | MacArthur et al. |
| 8,649,961 | B2 | 2/2014 | Hawkins et al. |
| 8,667,288 | B2 | 3/2014 | Yavuz |
| 8,694,197 | B2 | 4/2014 | Rajagopalan et al. |
| 8,700,291 | B2 | 4/2014 | Herrmann |
| 8,737,426 | B1 * | 5/2014 | Fredriksson .......... H04J 3/07 370/464 |
| 8,751,241 | B2 | 6/2014 | Oesterling et al. |
| 8,762,026 | B2 | 6/2014 | Wolfe et al. |
| 8,763,377 | B2 | 7/2014 | Yacoub |
| 8,768,996 | B2 | 7/2014 | Shokrollahi et al. |
| 8,813,690 | B2 | 8/2014 | Kumar et al. |
| 8,825,243 | B2 | 9/2014 | Yang et al. |
| 8,839,967 | B2 | 9/2014 | Schneider et al. |
| 8,867,746 | B2 | 10/2014 | Ceskutti et al. |
| 8,892,221 | B2 | 11/2014 | Kram et al. |
| 8,899,018 | B2 | 12/2014 | Frazier et al. |
| 8,904,760 | B2 | 12/2014 | Mital |
| 8,983,069 | B2 | 3/2015 | Merchan et al. |
| 9,100,193 | B2 | 8/2015 | Newsome et al. |
| 9,141,996 | B2 | 9/2015 | Christensen et al. |
| 9,170,573 | B2 | 10/2015 | Kihas |
| 9,175,595 | B2 | 11/2015 | Ceynow et al. |
| 9,223,301 | B2 | 12/2015 | Stewart et al. |
| 9,243,576 | B2 | 1/2016 | Yu et al. |
| 9,253,200 | B2 | 2/2016 | Schwarz et al. |
| 9,325,494 | B2 | 4/2016 | Boehl |
| 9,367,701 | B2 | 6/2016 | Merchan et al. |
| 9,367,968 | B2 | 6/2016 | Giraud et al. |
| 9,419,737 | B2 * | 8/2016 | Fredriksson ........ H04L 12/4135 |

(56) References Cited

U.S. PATENT DOCUMENTS

| | | | |
|---|---|---|---|
| 9,432,488 B2* | 8/2016 | Fredriksson | H04J 3/0652 |
| 9,483,881 B2 | 11/2016 | Comeau et al. | |
| 9,560,071 B2 | 1/2017 | Ruvio et al. | |
| 9,779,742 B2 | 10/2017 | Newsome, Jr. | |
| 2002/0112469 A1 | 8/2002 | Kanazawa et al. | |
| 2004/0006973 A1 | 1/2004 | Makki et al. | |
| 2004/0044908 A1* | 3/2004 | Markham | H04L 63/0272 |
| | | | 726/28 |
| 2004/0086185 A1 | 5/2004 | Sun | |
| 2004/0144082 A1 | 7/2004 | Mianzo et al. | |
| 2004/0199481 A1 | 10/2004 | Hartman et al. | |
| 2004/0226287 A1 | 11/2004 | Edgar et al. | |
| 2005/0171667 A1 | 8/2005 | Morita | |
| 2005/0187643 A1 | 8/2005 | Sayyar-Rodsari et al. | |
| 2005/0193739 A1 | 9/2005 | Brunnell et al. | |
| 2005/0210868 A1 | 9/2005 | Funabashi | |
| 2006/0047607 A1 | 3/2006 | Boyden et al. | |
| 2006/0111881 A1 | 5/2006 | Jackson | |
| 2006/0137347 A1 | 6/2006 | Stewart et al. | |
| 2006/0168945 A1 | 8/2006 | Samad et al. | |
| 2006/0185626 A1 | 8/2006 | Allen et al. | |
| 2006/0212140 A1 | 9/2006 | Brackney | |
| 2007/0144149 A1 | 6/2007 | Kolavennu et al. | |
| 2007/0156259 A1 | 7/2007 | Baramov et al. | |
| 2007/0240213 A1 | 10/2007 | Karam et al. | |
| 2007/0261648 A1 | 11/2007 | Reckels et al. | |
| 2007/0275471 A1 | 11/2007 | Coward | |
| 2008/0010973 A1 | 1/2008 | Gimbres | |
| 2008/0103747 A1 | 5/2008 | Macharia et al. | |
| 2008/0132178 A1 | 6/2008 | Chatterjee et al. | |
| 2008/0208778 A1 | 8/2008 | Sayyar-Rodsari et al. | |
| 2008/0289605 A1 | 11/2008 | Ito | |
| 2009/0041247 A1* | 2/2009 | Barany | H04L 63/06 |
| | | | 380/270 |
| 2009/0172416 A1 | 7/2009 | Bosch et al. | |
| 2009/0312998 A1 | 12/2009 | Berckmans et al. | |
| 2010/0122523 A1 | 5/2010 | Vosz | |
| 2010/0126481 A1 | 5/2010 | Willi et al. | |
| 2010/0300069 A1 | 12/2010 | Herrmann et al. | |
| 2011/0056265 A1 | 3/2011 | Yacoub | |
| 2011/0060424 A1 | 3/2011 | Havlena | |
| 2011/0125295 A1 | 5/2011 | Bednasch et al. | |
| 2011/0131017 A1 | 6/2011 | Cheng et al. | |
| 2011/0161673 A1* | 6/2011 | Shin | H04W 12/0013 |
| | | | 713/176 |
| 2011/0167025 A1 | 7/2011 | Danai et al. | |
| 2011/0173315 A1 | 7/2011 | Aguren | |
| 2011/0264353 A1 | 10/2011 | Atkinson et al. | |
| 2011/0270505 A1 | 11/2011 | Chaturvedi et al. | |
| 2012/0024089 A1 | 2/2012 | Couey et al. | |
| 2012/0109620 A1 | 5/2012 | Gaikwad et al. | |
| 2012/0174187 A1 | 7/2012 | Argon et al. | |
| 2013/0024069 A1 | 1/2013 | Wang et al. | |
| 2013/0067894 A1 | 3/2013 | Stewart et al. | |
| 2013/0111878 A1 | 5/2013 | Pachner et al. | |
| 2013/0111905 A1 | 5/2013 | Pekar et al. | |
| 2013/0131954 A1 | 5/2013 | Yu et al. | |
| 2013/0131956 A1 | 5/2013 | Thibault et al. | |
| 2013/0158834 A1 | 6/2013 | Wagner et al. | |
| 2013/0204403 A1 | 8/2013 | Zheng et al. | |
| 2013/0242706 A1 | 9/2013 | Newsome, Jr. | |
| 2013/0326232 A1 | 12/2013 | Lewis et al. | |
| 2013/0326630 A1 | 12/2013 | Argon | |
| 2013/0338900 A1 | 12/2013 | Ardanese et al. | |
| 2014/0032189 A1 | 1/2014 | Hehle et al. | |
| 2014/0034460 A1 | 2/2014 | Chou | |
| 2014/0171856 A1 | 6/2014 | McLaughlin et al. | |
| 2014/0258736 A1 | 9/2014 | Merchan et al. | |
| 2014/0270163 A1 | 9/2014 | Merchan | |
| 2014/0280636 A1* | 9/2014 | Fredriksson | H04J 3/0652 |
| | | | 709/206 |
| 2014/0316683 A1 | 10/2014 | Whitney et al. | |
| 2014/0318216 A1 | 10/2014 | Singh | |
| 2014/0343713 A1 | 11/2014 | Ziegler et al. | |
| 2014/0358254 A1 | 12/2014 | Chu et al. | |
| 2015/0121071 A1 | 4/2015 | Schwarz et al. | |
| 2015/0275783 A1 | 10/2015 | Wong et al. | |
| 2015/0321642 A1 | 11/2015 | Schwepp et al. | |
| 2015/0324576 A1 | 11/2015 | Quirant et al. | |
| 2015/0334093 A1 | 11/2015 | Mueller | |
| 2015/0354877 A1 | 12/2015 | Burns et al. | |
| 2016/0003180 A1 | 1/2016 | McNulty et al. | |
| 2016/0043832 A1 | 2/2016 | Ahn et al. | |
| 2016/0108732 A1 | 4/2016 | Huang et al. | |
| 2016/0127357 A1 | 5/2016 | Libuschka et al. | |
| 2016/0216699 A1 | 7/2016 | Pekar et al. | |
| 2016/0239593 A1 | 8/2016 | Pekar et al. | |
| 2016/0259584 A1 | 9/2016 | Schlottmann et al. | |
| 2016/0330204 A1 | 11/2016 | Baur et al. | |
| 2016/0344705 A1 | 11/2016 | Stumpf et al. | |
| 2016/0362838 A1 | 12/2016 | Badwe et al. | |
| 2016/0365977 A1 | 12/2016 | Boutros et al. | |
| 2017/0031332 A1 | 2/2017 | Santin | |
| 2017/0048063 A1 | 2/2017 | Mueller | |
| 2017/0093659 A1* | 3/2017 | Elend | H04L 43/08 |
| 2017/0126679 A1* | 5/2017 | Fredriksson | H04L 12/40 |
| 2017/0126701 A1 | 5/2017 | Glas et al. | |
| 2017/0218860 A1 | 8/2017 | Pachner et al. | |
| 2017/0235698 A1* | 8/2017 | van der Maas | G06F 11/0745 |
| | | | 710/106 |
| 2017/0300713 A1 | 10/2017 | Fan et al. | |
| 2017/0306871 A1 | 10/2017 | Fuxman et al. | |
| 2018/0115575 A1* | 4/2018 | Hartkopp | H04L 12/40 |
| 2018/0181743 A1* | 6/2018 | Hofman | G06F 21/55 |
| 2018/0336338 A1* | 11/2018 | Hofman | G06F 21/44 |

FOREIGN PATENT DOCUMENTS

| | | |
|---|---|---|
| DE | 19628796 C1 | 10/1997 |
| DE | 10219382 A1 | 11/2002 |
| DE | 102009016509 A1 | 10/2010 |
| DE | 102011103346 A1 | 8/2012 |
| EP | 0301527 A2 | 2/1989 |
| EP | 0877309 B1 | 6/2000 |
| EP | 1134368 A2 | 9/2001 |
| EP | 1180583 A2 | 2/2002 |
| EP | 1221544 A2 | 7/2002 |
| EP | 1225490 A2 | 7/2002 |
| EP | 1245811 A2 | 10/2002 |
| EP | 1273337 A1 | 1/2003 |
| EP | 0950803 B1 | 9/2003 |
| EP | 1420153 A2 | 5/2004 |
| EP | 1447727 A2 | 8/2004 |
| EP | 1498791 A1 | 1/2005 |
| EP | 1425642 B1 | 11/2005 |
| EP | 1686251 A1 | 8/2006 |
| EP | 1399784 B1 | 10/2007 |
| EP | 2107439 A1 | 10/2009 |
| EP | 2146258 A1 | 1/2010 |
| EP | 1794339 B1 | 7/2011 |
| EP | 1529941 B1 | 11/2011 |
| EP | 2543845 A1 | 1/2013 |
| EP | 2551480 A1 | 1/2013 |
| EP | 2589779 A2 | 5/2013 |
| EP | 2617975 A1 | 7/2013 |
| EP | 2267559 B1 | 1/2014 |
| EP | 2919079 A2 | 9/2015 |
| JP | 59190433 A | 10/1984 |
| JP | 2010282618 A | 12/2010 |
| WO | 0144629 A2 | 6/2001 |
| WO | 0169056 A1 | 9/2001 |
| WO | 0232552 A1 | 4/2002 |
| WO | 02097540 A1 | 12/2002 |
| WO | 02101208 A1 | 12/2002 |
| WO | 03023538 A2 | 3/2003 |
| WO | 03048533 A1 | 6/2003 |
| WO | 03065135 A1 | 8/2003 |
| WO | 03078816 A1 | 9/2003 |
| WO | 03102394 A1 | 12/2003 |
| WO | 2004027230 A1 | 4/2004 |
| WO | 2006021437 A1 | 3/2006 |
| WO | 2007078907 A2 | 7/2007 |
| WO | 2008033800 A2 | 3/2008 |
| WO | 2008115911 A1 | 9/2008 |

(56) References Cited

FOREIGN PATENT DOCUMENTS

| WO | 2012076838 | A2 | 6/2012 | | |
|---|---|---|---|---|---|
| WO | 2013119665 | A1 | 8/2013 | | |
| WO | 2014165439 | A2 | 10/2014 | | |
| WO | 2016053194 | A1 | 4/2016 | | |
| WO | WO-2017013622 | A1 | * | 1/2017 | ............ G06F 21/85 |

OTHER PUBLICATIONS

Extended European Search Report for EP Application No. 17151521. 6, dated Oct. 23, 2017.
Extended European Search Report for EP Application No. 17163452. 0, dated Sep. 26, 2017.
Greenberg, "Hackers Cut a Corvette's Brakes Via a Common Car Gadget," downloaded from https://www.wired.com2015/08/hackers-cut-corvettes-brakes-v..., 14 pages, Aug. 11, 2015, printed Dec. 11, 2017.
http://www.blackpoolcommunications.com/products/alarm-immo...., "OBD Security OBD Port Protection—Alarms & Immobilizers . . . ," 1 page, printed Jun. 5, 2017.
http://www.cnbc.com/2016/09/20/chinese-company-hacks-tesla-car-remotely.html, "Chinese Company Hacks Tesla Car Remotely," 3 pages, Sep. 20, 2016.
ISO, "ISO Document No. 13185-2:2015(E)," 3 pages, 2015.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Dunbar, "Model Predictive Control: Extension to Coordinated Multi-Vehicle Formations and Real-Time Implementation," CDS Technical Report 01-016, 64 pages, Dec. 7, 2001.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.
Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on aontrol Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
Gamma Technologies, "Exhaust Aftertreatment with GT-Suite," 2 pages, Jul. 17, 2014.
GM "Advanced Diesel Technology and Emissions," powertrain technologies—engines, 2 pages, prior to Feb. 2, 2005.
Goodwin, "Researchers Hack a Corvette's Brakes Via Insurance Black Box," Downloaded from http://www.cnet.com/roadshow/news/researchers-hack-a-corvettes-brakes-via-insurance-black-box/, 2 pages, Aug. 2015.
Greenberg, "Hackers Remotely Kill a Jeep on the Highway—With Me in It," Downloaded from http://www.wired.com/2015/07/hackers-remotely-kill-jeep-highway/, 24 pages, Jul. 21, 2015.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.

Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella et al., "Introduction to Modeling and Control of Internal Combustion Engine Systems," 303 pages, 2004.
Guzzella, et al., "Control of Diesel Engines," IEEE Control Systems Magazine, pp. 53-71, Oct. 1998.
Hahlin, "Single Cylinder ICE Exhaust Optimization," Master's Thesis, retrieved from https://pure.ltu.se/portal/files/44015424/LTU-EX-2013-43970821.pdf, 50 pages, Feb. 1, 2014.
Hammacher Schlemmer, "The Windshield Heads Up Display," Catalog, p. 47, prior to Apr. 26, 2016.
Havelena, "Componentized Architecture for Advanced Process Management," Honeywell International, 42 pages, 2004.
Heywood, "Pollutant Formation and Control," Internal Combustion Engine Fundamentals, pp. 567-667, 1988.
Hiranuma, et al., "Development of DPF System for Commercial Vehicle—Basic Characteristic and Active Regeneration Performance," SAE Paper No. 2003-01-3182, Mar. 2003.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
Honeywell, "Profit Optimizer a Distributed Quadratic Program (DQP) Concepts Reference," 48 pages, prior to Feb. 2, 2005.
http://nexceris.com/news/nextech-materials/, "NEXTECH Materials is Now NEXCERIS," 7 pages, printed Oct. 4, 2016.
http://www.arb.ca.gov/msprog/obdprog/hdobdreg.htm, "Heavy-Duty OBD Regulations and Rulemaking," 8 pages, printed Oct. 4, 2016.
http://www.not2fast.wryday.com/turbo/glossary/turbo_glossary. shtml, "Not2Fast: Turbo Glossary," 22 pages, printed Oct. 1, 2004.
http://www.tai-cwv.com/sb1106.0.html, "Technical Overview—Advanced Control Solutions," 6 pages, printed Sep. 9, 2004.
https://www.dieselnet.com/standards/us/obd.php, "Emission Standards: USA: On-Board Diagnostics," 6 pages, printed Oct. 3, 2016.
https://www.en.wikipedia.org/wiki/Public-key_cryptography, "Public-Key Cryptography," 14 pages, printed Feb. 26, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.
Jensen, "The 13 Monitors of an OBD System," http://www.oemoffhighway.com/article/1 0855512/the-13-monito..., 3 pages, printed Oct. 3, 2016.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Keulen et al., "Predictive Cruise Control in Hybrid Electric Vehicles," World Electric Journal, vol. 3, ISSN 2032-6653, 11 pages, May 2009.
Khair et al., "Emission Formation in Diesel Engines," Downloaded from https://www.dieselnet.com/tech/diesel_emiform.php, 33 pages, printed Oct. 14, 2016.

(56) References Cited

OTHER PUBLICATIONS

Kihas et al., "Chapter 14, Diesel Engine SCR Systems: Modeling Measurements and Control," Catalytic Reduction Technology (book), Part 1, Chapter 14, prior to Jan. 29, 2016.
Kolmanovsky et al., "Issues in Modeling and Control of Intake Flow in Variable Geometry Turbocharged Engines", 18th IFIP Conf. System Modeling and Optimization, pp. 436-445, Jul. 1997.
Krause et al., "Effect of Inlet Air Humidity and Temperature on Diesel Exhaust Emissions," SAE International Automotive Engineering Congress, 8 pages, Jan. 8-12, 1973.
Kulhavy et al. "Emerging Technologies for Enterprise Optimization in the Process Industries," Honeywell, 12 pages, Dec. 2000.
Lavoie et al., "Experimental and Theoretical Study of Nitric Oxide Formation in Internal Combustion Engines," Combustion Science and Technology, vol. 1, pp. 313-326, 1970.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
"Model Predictive Control Toolbox Release Notes," The Mathworks, 24 pages, Oct. 2008.
"Model Predictive Control," Wikipedia, pp. 1-5, Jan. 22, 2009. http://en.wikipedia.org/w/index.php/title=Special:Book&bookcmd=download&collecton_id=641cd1b5da77cc22&writer=rl&return_to=Model predictive control, retrieved Nov. 20, 2012.
"MPC Implementation Methods for the Optimization of the Response of Control Valves to Reduce Variability," Advanced Application Note 002, Rev. A, 10 pages, 2007.
"SCR, 400-csi Coated Catalyst," Leading NOx Control Technologies Status Summary, 1 page prior to Feb. 2, 2005.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_..., 5 pages, printed Sep. 27, 2016.
Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Arregle et al., "On Board NOx Prediction in Diesel Engines: A Physical Approach," Automotive Model Predictive Control, Models Methods and Applications, Chapter 2, 14 pages, 2010.
Asprion, "Optimal Control of Diesel Engines," PHD Thesis, Diss ETH No. 21593, 436 pages, 2013.
Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al., "Non-Linear Model Based Predictive Control Through Dynamic Non-Linear Partial Least Squares," Trans IChemE, vol. 80, Part A, pp. 75-86, Jan. 2002.
Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Bemporad et al., "Model Predictive Control Toolbox 3, User's Guide," Matlab Mathworks, 282 pages, 2008.
Bemporad et al., "The Explicit Linear Quadratic Regulator for Constrained Systems," Automatica, 38, pp. 3-20, 2002.
Bemporad, "Model Predictive Control Based on Linear Programming—The Explicit Solution," IEEE Transactions on Automatic Control, vol. 47, No. 12, pp. 1974-1984, Dec. 2002.
Bemporad, "Model Predictive Control Design: New Trends and Tools," Proceedings of the 45th IEEE Conference on Decision & Control, pp. 6678-6683, Dec. 13-15, 2006.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints*," SIAM J. Control and Optimization, vol. 20, No. 2, pp. 221-246, Mar. 1982.
Blanco-Rodriguez, "Modelling and Observation of Exhaust Gas Concentrations for Diesel Engine Control," Phd Dissertation, 242 pages, Sep. 2013.
Blue Streak Electronics Inc., "Ford Modules," 1 page, May 12, 2010.
Borrelli et al., "An MPC/Hybrid System Approach to Traction Control," IEEE Transactions on Control Systems Technology, vol. 14, No. 3, pp. 541-553, May 2006.
Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bourn et al., "Advanced Compressor Engine Controls to Enhance Operation, Reliability and Integrity," Southwest Research Institute, DOE Award No. DE-FC26-03NT41859, SwRI Project No. 03.10198, 60 pages, Mar. 2004.
Catalytica Energy Systems, "Innovative NOx Reduction Solutions for Diesel Engines," 13 pages, 3rd Quarter, 2003.
Charalampidis et al., "Computationally Efficient Kalman Filtering for a Class of Nonlinear Systems," IEEE Transactions on Automatic Control, vol. 56, No. 3, pp. 483-491, Mar. 2011.
Chatterjee, et al. "Catalytic Emission Control for Heavy Duty Diesel Engines," JM, 46 pages, prior to Feb. 2, 2005.
Chew, "Sensor Validation Scheme with Virtual NOx Sensing for Heavy Duty Diesel Engines," Master's Thesis, 144 pages, 2007.
European Search Report for EP Application No. 11167549.2 dated Nov. 27, 2012.
European Search Report for EP Application No. 12191156.4-1603 dated Feb. 9, 2015.
European Search Report for EP Application No. EP 10175270.7-2302419 dated Jan. 16, 2013.

(56) References Cited

OTHER PUBLICATIONS

European Search Report for EP Application No. EP 15152957.5-1807 dated Feb. 10, 2015.
Extended European Search Report for EP Application No. 15155295.7-1606, dated Aug. 4, 2015.
Extended European Search Report for EP Application No. 15179435.1, dated Apr. 1, 2016.
De Oliveira, "Constraint Handling and Stability Properties of Model Predictive Control," Carnegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, VA, pp. 319-324, Jun. 2001.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Maciejowski, "Predictive Control with Constraints," Prentice Hall, Pearson Education Limited, 4 pages, 2002.
Manchur et al., "Time Resolution Effects on Accuracy of Real-Time NOx Emissions Measurements," SAE Technical Paper Series 2005-01-0674, 2005 SAE World Congress, 19 pages, Apr. 11-14, 2005.
Mariethoz et al., "Sensorless Explicit Model Predictive Control of the DC-DC Buck Converter with Inductor Current Limitation," IEEE Applied Power Electronics Conference and Exposition, pp. 1710-1715, 2008.
Marjanovic, "Towards a Simplified Infinite Horizon Model Predictive Controller," 6 pages, Proceedings of the 5th Asian Control Conference, 6 pages, Jul. 20-23, 2004.
Mehta, "The Application of Model Predictive Control to Active Automotive Suspensions," 56 pages, May 17, 1996.
Mohammadpour et al., "A Survey on Diagnostics Methods for Automotive Engines," 2011 American Control Conference, pp. 985-990, Jun. 29-Jul. 1, 2011.
Moore, "Living with Cooled-EGR Engines," Prevention Illustrated, 3 pages, Oct. 3, 2004.
Moos, "Catalysts as Sensors —A Promising Novel Approach in Automotive Exhaust Gas Aftertreatment," http://www.mdpi.com/1424-8220/10/7/6773htm, 10 pages, Jul. 13, 2010.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control—Sulfur Effects Project (DECSE) Summary of Reports," U.S. Department of Energy, 19 pages, Feb. 2002.
Olsen, "Analysis and Simulation of the Rate of Heat Release (ROHR) in Diesel Engines," MSc-Assignment, 105 pages, Jun. 2013.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control," IEEE Transactions on Automatic Control, vol. 52, No. 6, 6 pages, 2007.
Patrinos et al., "A Global Piecewise Smooth Newton Method for Fast Large-Scale Model Predictive Control," Tech Report TR2010-02, National Technical University of Athens, 23 pages, 2010.
Payri et al., "Diesel NOx Modeling with a Reduction Mechanism for the Initial NOx Coming from EGR or Re-Entrained Burned Gases," 2008 World Congress, SAE Technical Paper Series 2008-01-1188, 13 pages, Apr. 14-17, 2008.
Payri et al., "Methodology for Design and Calibration of a Drift Compensation Method for Fuel-to-Air Ratio," SAE International 2012-01-0717, 13 pages, Apr. 16, 2012.

Pipho et al.' "NO2 Formation in a Diesel Engine," SAE Technical Paper Series 910231, International Congress and Exposition, 15 pages, Feb. 25-Mar. 1, 1991.
Qin et al., "A Survey of Industrial Model Predictive Control Technology," Control Engineering Practice, 11, pp. 733-764, 2003.
Querel et al., "Control of an SCR System Using a Virtual NOx Sensor," 7th IFAC Symposium on Advances in Automotive Control, The International Federation of Automotive Control, pp. 9-14, Sep. 4-7, 2013.
Rajamani, "Data-based Techniques to Improve State Estimation in Model Predictive Control," Ph.D. Dissertation, 257 pages, 2007.
Rawlings, "Tutorial Overview of Model Predictive Control," IEEE Control Systems Magazine, pp. 38-52, Jun. 2000.
Ricardo Software, "Powertrain Design at Your Fingertips," retrieved from http://www.ricardo.com/PageFiles/864/WaveFlyerA4_4PP.pdf, 2 pages, downloaded Jul. 27, 2015.
Salvat, et al., "Passenger Car Serial Application of a Particulate Filter System on a Common Rail Direct Injection Engine," SAE Paper No. 2000-01-0473, 14 pages, Feb. 2000.
Santin et al., "Combined Gradient/Newton Projection Semi-Explicit QP Solver for Problems with Bound Constraints," 2 pages, prior to Jan. 29, 2016.
Schauffele et al., "Automotive Software Engineering Principles, Processes, Methods, and Tools," SAE International, 10 pages, 2005.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Shamma, et al. "Approximate Set-Valued Observers for Nonlinear Systems," IEEE Transactions on Automatic Control, vol. 42, No. 5, May 1997.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the 47th IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Storset et al., "Air Charge Estimation for Turbocharged Diesel Engines," vol. 1 Proceedings of the American Control Conference, 8 pages, Jun. 28-30, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

(56) References Cited

OTHER PUBLICATIONS

Tondel et al., "An Algorithm for Multi-Parametric Quadratic Programming and Explicit MPC Solutions," Automatica, 39, pp. 489-497, 2003.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.
Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, a Copy of the Front and Back Covers and Table of Contents are Provided, 2009.
Van Basshuysen et al., "Lexikon Motorentechnik," (Dictionary of Automotive Technology) published by Vieweg Verlag, Wiesbaden 039936, p. 518, 2004. (English Translation).
Van Den Boom et al., "MPC for Max-Plus-Linear Systems: Closed-Loop Behavior and Tuning," Proceedings of the 2001 American Control Conference, Arlington, Va, pp. 325-330, Jun. 2001.
Van Heiden et al., "Optimization of Urea SCR deNOx Systems for HD Diesel Engines," SAE International 2004-01-0154, 13 pages, 2004.
Van Keulen et al., "Predictive Cruise Control in Hybrid Electric Vehicles," World Electric Vehicle Journal vol. 3, ISSN 2032-6653, pp. 1-11, 2009.
VDO, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control Conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Fast Model Predictive Control Using Online Optimization," Proceedings of the 17th World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Wang et al., "Sensing Exhaust NO2 Emissions Using the Mixed Potential Principal," SAE 2014-01-1487, 7 pages, Apr. 1, 2014.
Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-01-1509, 11 pages, 2009.

Winkler et al., "Incorporating Physical Knowledge About the Formation of Nitric Oxides into Evolutionary System Identification," Proceedings of the 20th European Modeling and Simulation Symposium (EMSS), 6 pages, 2008.
Winkler et al., "On-Line Modeling Based On Genetic Programming," 12 pages, International Journal on Intelligent Systems Technologies and Applications 2, 2007.
Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Wright, "Applying New Optimization Algorithms to Model Predictive Control," 5th International Conference on Chemical Process Control, 10 pages, 1997.
Yao et al., "The Use of Tunnel Concentration Profile Data to Determine the Ratio of NO2/NOx Directly Emitted from Vehicles," HAL Archives, 19 pages, 2005.
Zaman, "Lincoln Motor Company: Case study 2015 Lincoln MKC," Automotive Electronic Design Fundamentals, Chapter 6, 2015.
Zavala et al., "The Advance-Step NMPC Controller: Optimality, Stability, and Robustness," Automatica, vol. 45, pp. 86-93, 2009.
Zeilinger et al., "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.
Zeldovich, "The Oxidation of Nitrogen in Combustion and Explosions," ACTA Physiochimica U.R.S.S., vol. XX1, No. 4, 53 pages, 1946.
Zelenka, et al., "An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
Desantes et al., "Development of NOx Fast Estimate Using NOx Sensor," EAEC 2011 Congress, 2011. Unable to Obtain a Copy of This Reference.
Andersson et al., "Fast Physical NOx Prediction in Diesel Engines, The Diesel Engine: The Low CO2 and Emissions Reduction Challenge," Conference Proceedings, Lyon, 2006. Unable to Obtain a Copy of This Reference.
Winkler, "Evolutionary System Identification—Modern Approaches and Practical Applications," Kepler Universitat Linz, Reihe C: Technik and Naturwissenschaften, Universitatsverlag Rudolf Trauner, 2009. Unable to Obtain a Copy of This Reference.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000. Unable to Obtain a Copy of This Reference.

\* cited by examiner

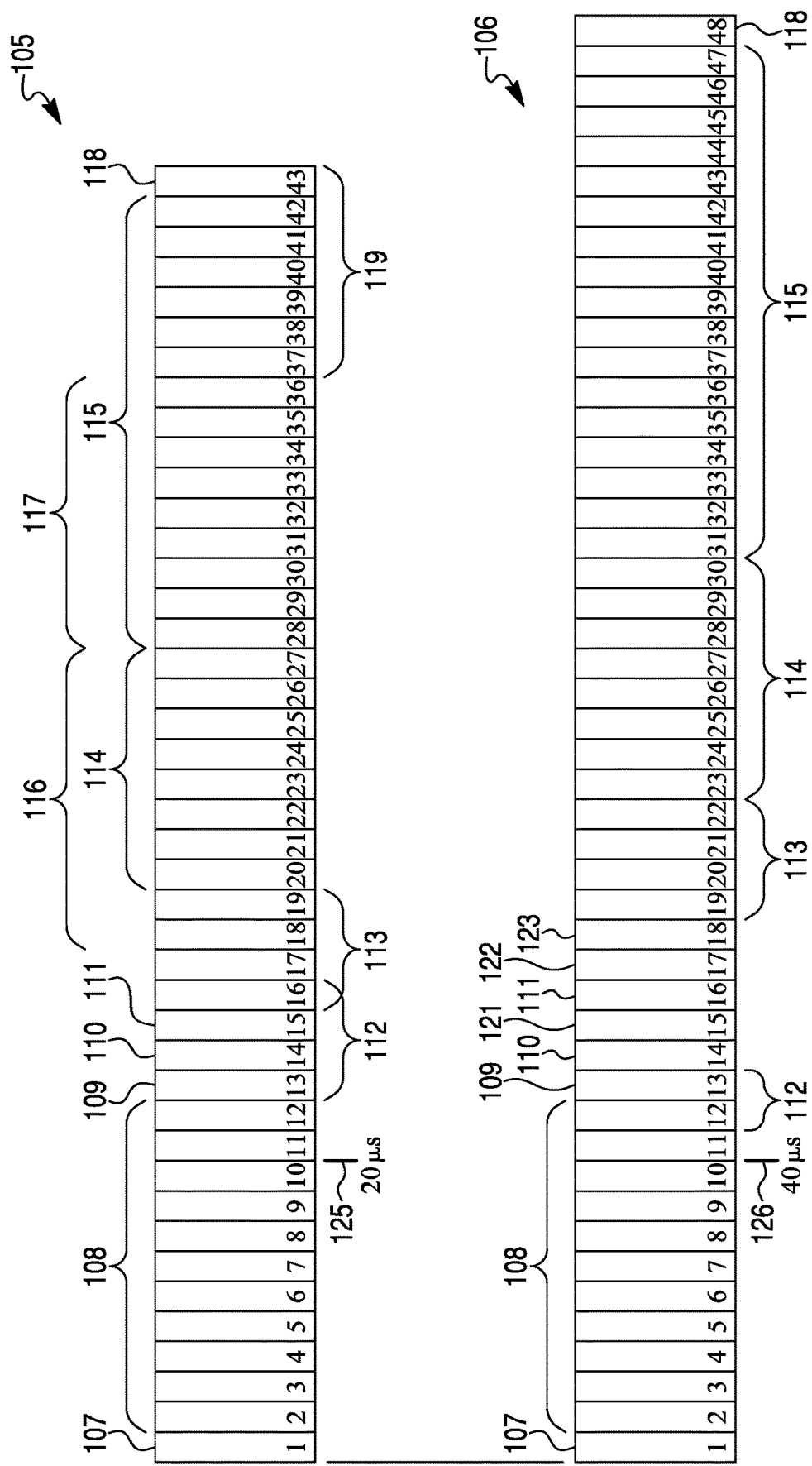

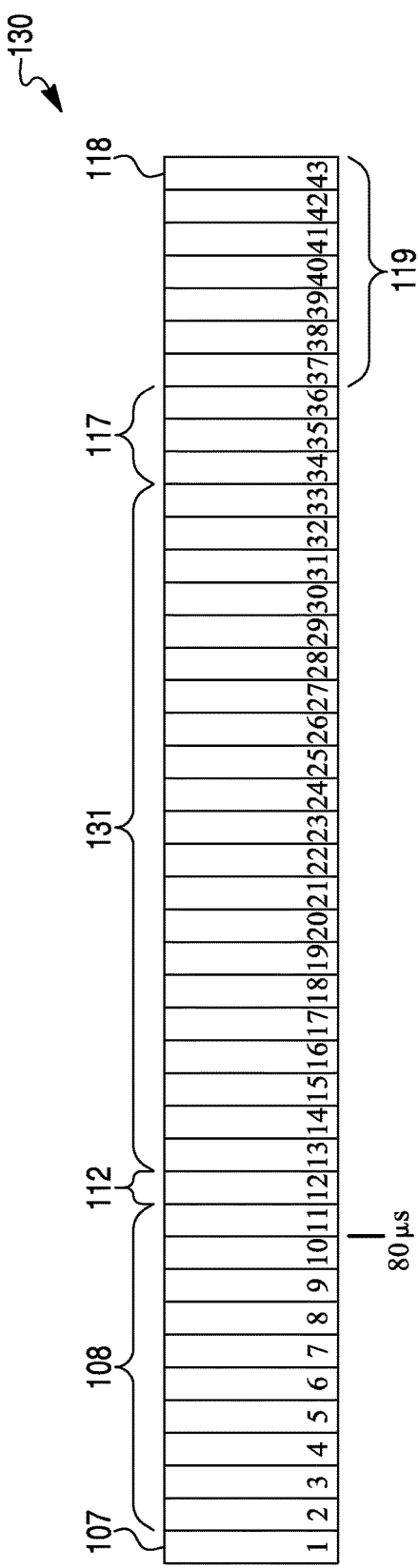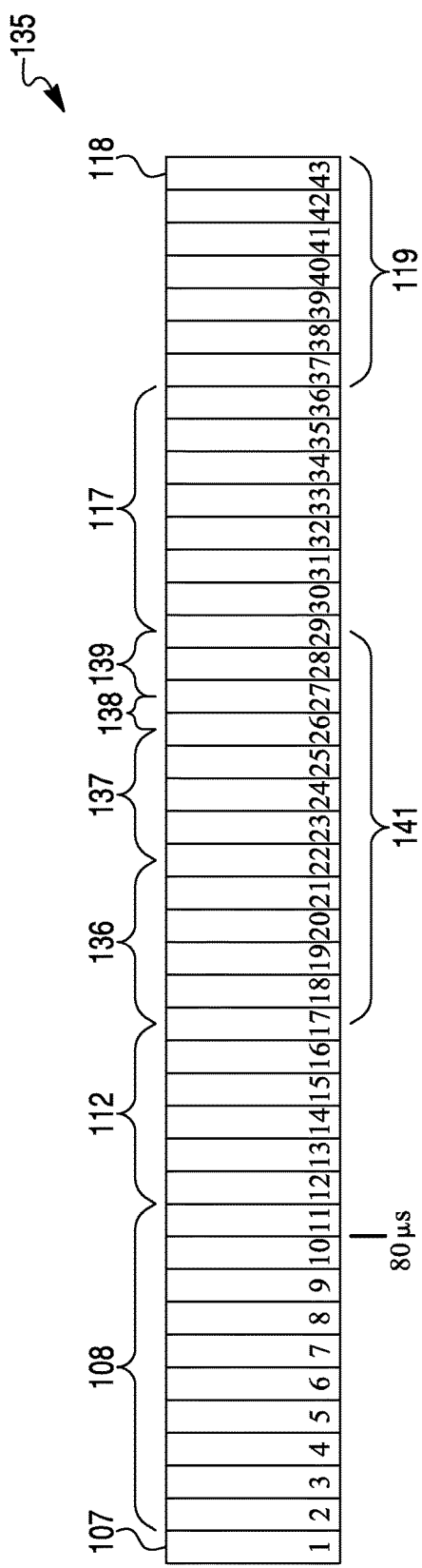

AUTHENTICATION SYSTEM FOR ELECTRONIC CONTROL UNIT ON A BUS

BACKGROUND

The present disclosure pertains to preventing unauthorized messages in communication systems.

SUMMARY

The disclosure reveals an authentication system having a communications bus, a transmitter connected to the bus, and a receiver connected to the bus. A physical layer signal may be applied by the transmitter to a message on the bus for authenticating the transmitter. The physical layer signal may incorporate an identifier (ID) of the transmitter. The receiver may receive the message and decode the physical layer signal on the message. Decoding the physical layer signal on the message may reveal the ID of the transmitter sending the message. The receiver may look up the ID on a list of IDs corresponding to transmitters approved to send the message, to determine whether the ID of the transmitter sending the message matches an ID on the list. Only if the ID of the transmitter matches an ID on the list, then the transmitter may be authenticated and authorized to send the message.

BRIEF DESCRIPTION OF THE DRAWING

FIGS. 13, 14 and 15 are diagrams of message packets used for timing analysis in aiding of determining authentication with transmission and decoding in order to prevent a successful transmission of messages from unauthorized sources;

DESCRIPTION

Figure 1:
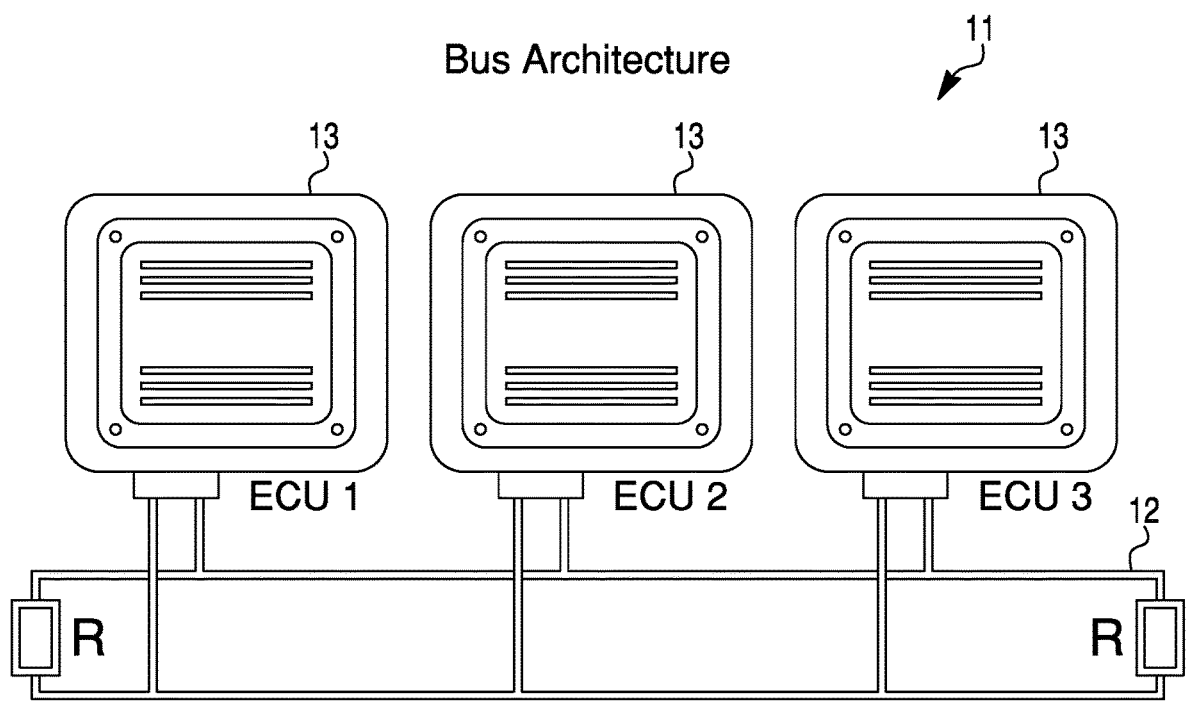
FIG. 1 is a diagram of what modern vehicles may incorporate in terms of on-board computing functions.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Authentication system and approach for electronic control unit on a bus may involve electronic control unit (ECU) radio frequency (RF) identification. A present system may integrate some of the identification/authentication functions into a transceiver in order to reduce costs.

The present system and approach may use controller area network (CAN) herein for illustrative purposes, but instead media such as other wired media, optical media, radio frequency media, or so on, may be used singularly or in combination.

A CAN based bus used within the automotive environment does not necessarily appear to provide source authentication of messages on the bus. This may be a security issue. Cryptographic methods of providing source authentication may be problematic due to protocol restrictions and the complexities of key management in the repair environment.

A feature of the present system can be unique because it may eliminate a need for costly and complex cryptographic key management. The system may provide an ability to authenticate the sources of a message on the CAN bus. This may in turn allow a higher level of security for connected cars and self-driving cars (aka, highly automated vehicles).

This system may draw licensing revenue if offered to CAN bus transceiver vendors. There may be a market for companies to offer a CAN intrusion detection system (IDS) with a capability that may differentiate it from other systems.

The present system may add a modulator function to the CAN bus transceiver such that each node on the network applies a unique analog fingerprint to the messages it sends. A secure/authenticating receiver may then check the message type and fingerprint to ensure that the message is from an authorized source. If the message is not from an authorized source, the authenticating receiver may block the message in such a way that all other ECUs on the bus also reject the unauthorized message.

The present system may have an embedded software type. The software may run in a device/unit (e.g., firmware).

A CAN transceiver vendor may be available, such as Texas Instruments or NXP. The system may improve automotive software CAN bus intrusion detection.

Modern vehicles may incorporate on-board computing functions (e.g., electronic control units (ECUs) 13 connected by a controller area network (CAN) bus 12 as shown by architecture 11 in FIG. 1. The CAN bus may be a non-authenticated broadcast bus. This means that any ECU on the bus may send a message and other ECUs on the bus may assume that the message came from the proper source and may act upon the message.

Hackers have demonstrated the ability to hack into such systems in cars and interfere with critical functions such as braking and steering. Thus, vehicle manufacturers may be looking for a low-cost way to address the security issues. Some approaches may attempt to apply cryptography to CAN bus messages as a way of performing source authentication. There may be some issues associated with CAN bus encryption.

One issue may involve key management. When cryptography is used, each ECU may need a unique cryptographic key to allow the source of messages to be cryptographically authenticated. When a vehicle is produced in the factory, the original equipment manufacturer (OEM) may generate the keys and load them into the vehicle. However, when vehicle maintenance requires the replacement of a module, the new module needs to be loaded with the appropriate key. One may ask from where the new key comes. Many issues may be associated with obtaining a copy of the original key. There may be also issues if the module is loaded with a new randomly generated key. That implies that all other modules in the vehicle need to be updated to recognize the new key/module pair. Many security issues arise with attackers manipulating the key management system to extract real keys or to inject false keys. Given the number of years a vehicle may be in service and the range of repair options (dealers, independent shops, and owners), using new parts or parts from a salvage yard, key management may become complex and error prone.

Another issue may involve a cryptographic algorithm and mode. The issue with the CAN bus may be that the payload is only 8 bytes (64 bits). Thus, there may be issues using modern cryptographic algorithms such as the advanced encryption standard (AES) which operates on 128 bit blocks. One may consider using non-standard cryptographic algorithms and modes. However, history appears to be littered with cases of home grown cryptography being broken. An alternate approach may be using a newer CAN protocol, a flexible data rate (CAN-FD). This approach may permit for larger data frames and thus allow a use of strong cryptography. However, CAN-FD based approaches may still suffer from the key management issues noted above.

The present system may allow ECUs on the bus to authenticate to a secure gateway/vehicle security module without the need for cryptography. Thus, there may be no compatibility issues between cryptographic algorithms and the CAN protocol. So, the complexity of key management in the vehicle maintenance environment may be reduced or eliminated.

The present system may be different than other CAN bus authentication proposals in that it explicitly takes advantage of an unbroken physical layer (as defined by an open system interconnect (OSI), a seven-layer model 14 or similar model) among ECUs on a bus. A diagram of FIG. 2 may contrast a standard IP environment 15 with the CAN bus environment 16. Within a typical IP environment 15, there is not necessarily a continuous physical layer path between a sender 17 and receiver 18. Therefore, the physical layer signal may be received and regenerated by intermediate network nodes such as routers 19 and Ethernet switches 19. This may force the use of cryptography at a layer above the physical layer to provide source authentication.

Figure 2:
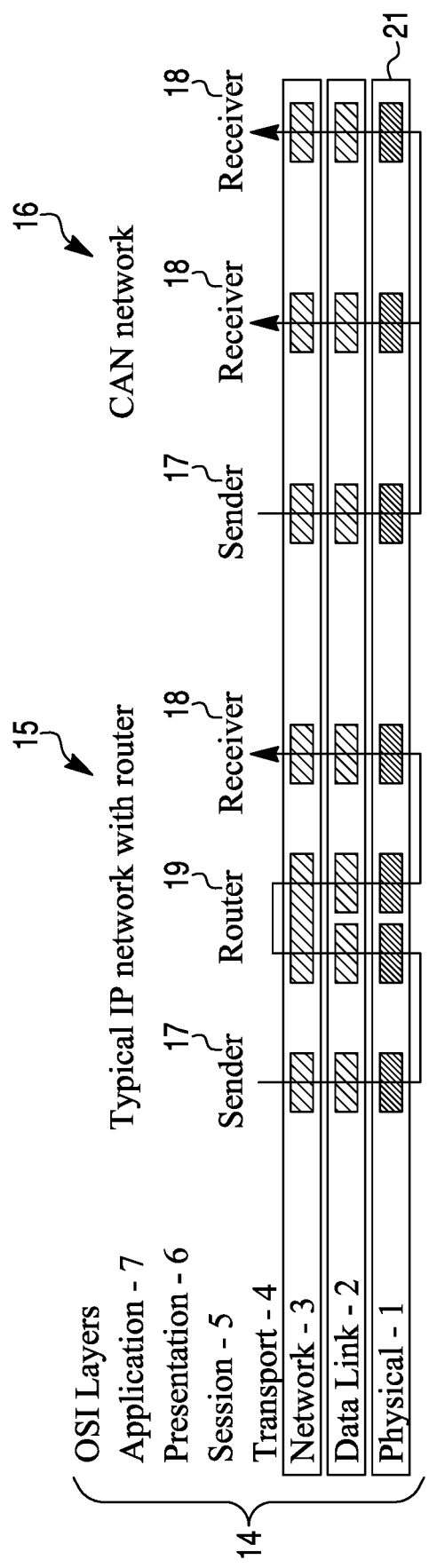
FIG. 2 is a diagram that contrasts a standard internet protocol environment with a controller area network bus environment.

FIG. 2 is a diagram of typical IP environment contrasted with the CAN environment. Within CAN bus environment 16, virtually all devices on the same CAN bus may be connected by the same physical medium 21. Thus, a physical layer signal applied by the sender 17 or transmitter may be observed by the receiver 18. The physical layer signal, since it is preserved from a sender 17 to the receiver 18, may be used as an alternative to cryptographic authentication.

The present system may solve the issue of ECU authentication according to the following approach. First, an analog signal (at the physical layer) may be applied to the message being transmitted. This signal may be unique for each transmitter on the bus. Thus, if there are 20 ECUs on a CAN bus, then 20 different analog signals may be used. These signals may be differentiated by time (when the analog signal starts and stops), frequency, type of modulation (amplitude, frequency/phase shift) or any combination of these factors. One implementation is to encode an ID number of the transmitter within the signal. The analog signal does not necessarily need to cover all bits of the message as in traditional communications. The analog signal only needs to cover enough bits so that the detector in the authenticating receiver can determine the ECU ID.

Figure 3A:
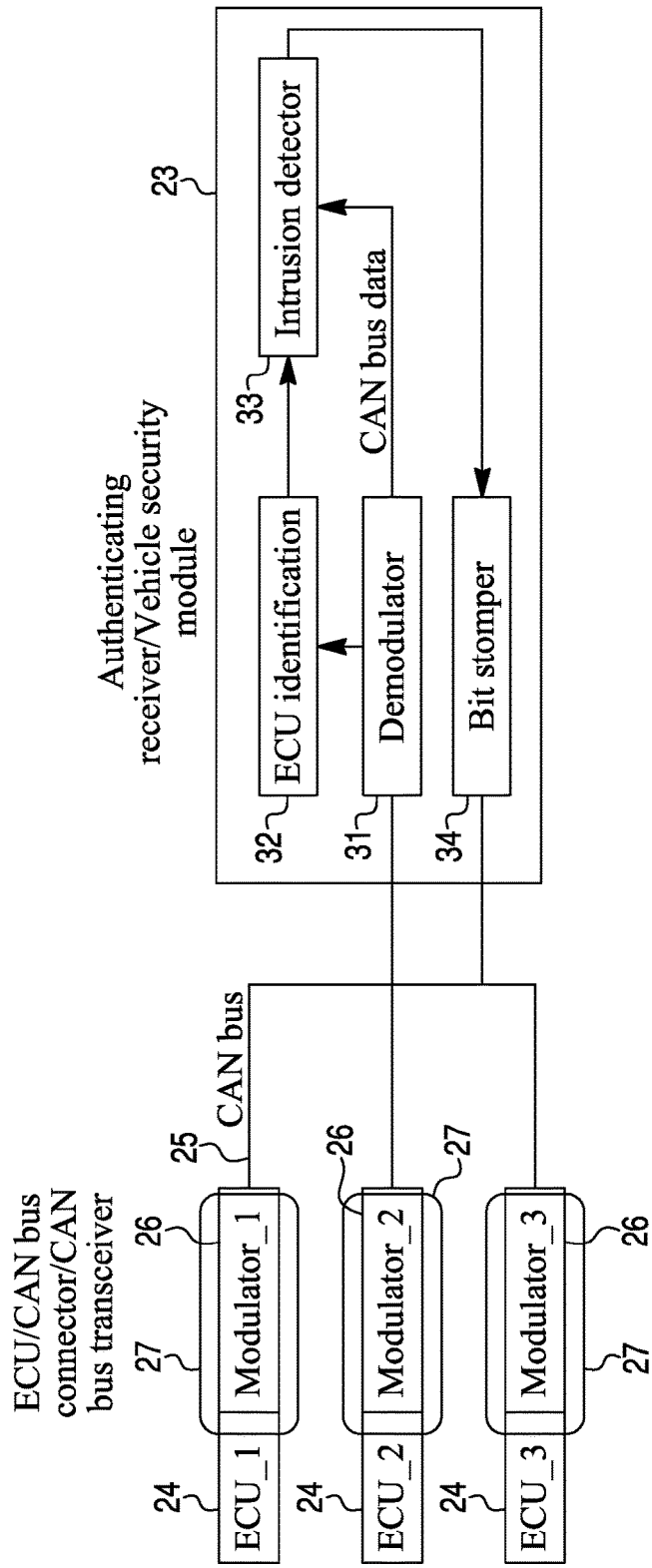
FIG. 3a is a diagram of an electronic control unit source authentication system.
Figure 3B:
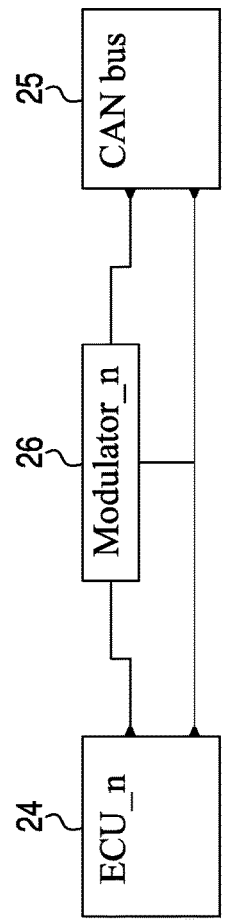
FIG. 3b is a diagram of a simplified version of applying a unique signal to a message from an electronic control unit by a dedicated modulator.
Figure 9:
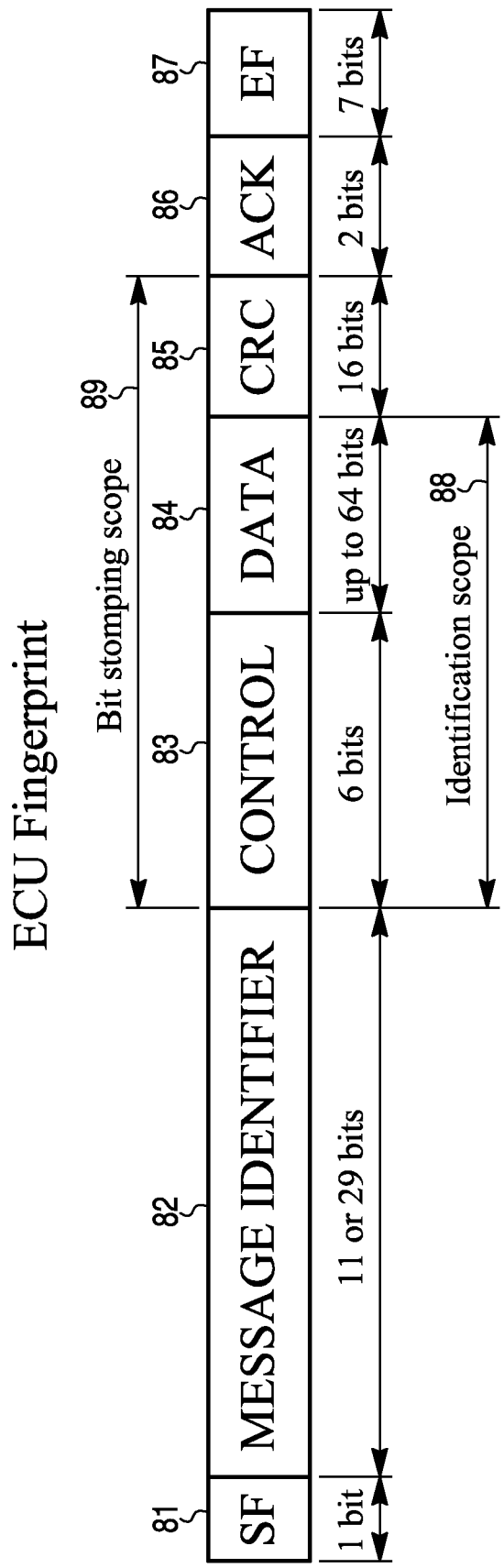
FIG. 9 is a diagram of an electronic control unit fingerprint applied to a controller area network message.

Second, one authenticating receiver 23 may be employed per bus 25. Receiver 23 may contain electronics to detect the analog signal and then determine the ECU 24 bound to that analog signal. This in effect may identify the ECU 24 which is transmitting. The authenticating receiver 23 may then check the message being transmitted against the set of ECUs 24 authorized to transmit the message. If a transmitter is sending an authorized message, the authenticating receiver 23 may allow the message to be transmitted. If the transmitter is sending an unauthorized message, then authenticating receiver may block the message by corrupting the cyclic redundancy code (CRC) on the message (FIG. 9). The corrupted CRC may cause virtually all the other receivers on the bus to discard the message. The result may be that only messages that are sent from authorized ECUs 24 are accepted (e.g., processed) by receiving ECUs. The ECU source authentication system is shown in FIG. 3a. A simplified version of applying a unique signal to a message from an ECU n 24 by a dedicated modulator n 26 to CAN bus 25 is shown in a diagram of FIG. 3b.

Each ECU 24 on a bus 25 which is to be authenticated may have a modulator 26 associated with its CAN bus transceiver 27. This modulator 26 may apply an analog signal to the messages sent by an ECU 24. The analog signal may be unique to the ECU 24 identifier. Thus, ECU_1 messages may be tagged with an analog signal 1. ECU_2 messages may be tagged with an analog signal 2, and so on. ECUs 24 may apply a similar analog signal (e.g., at the same frequency) but at different times. For example, ECU_1 may apply the analog signal to bits 0-3 of the messages while ECU_2 applies the same analog signal to bits 4-7 of the message. These ECUs 24 may apply the standard CRC check as specified by the CAN bus 25 protocol.

The number of possible schemes (frequency, timing, modulation, binary encoding of an ID number, and so forth) for tagging CAN bus 25 messages may be nearly unlimited. No attempt is necessarily made here to enumerate all the possible combinations. The parameters that a designer should work with may include the following items. One may be frequency. The frequency of the signal may be varied such that a low frequency represents one tag and a higher frequency represents a second tag. Another may be timing. The timing of when the modulation is applied, may be varied. The modulation may start at different bit times within a message, and its duration may also vary. It is also possible to support various patterns such as, for example, modulation on for 3 bits, off for 4 bits and then on for 5 bits. A binary number may be encoded using a modulation scheme such as frequency shift keying, on/off keying or other encoding techniques.

Another parameter may be waveform. There are many waveforms which may be used for signaling in addition to a simple sine wave. For example, quadrature phase shift keying may be used to encode many transmitter IDs.

Another parameter may be amplitude. The amplitude of the signal may be varied. While amplitude variation is possible, it may introduce potential issues of noise, attenuation and other physical issues which could make signal detection more complex.

Each ECU 24 on bus 25, which does not necessarily require source authentication, may have a legacy transceiver without a modulator. Thus, authenticating ECUs and non-authenticating ECUs may be mixed on the same bus and interoperate. There may be a risk that a non-authenticating ECU could transmit an unauthorized message. However, the reality of vehicle production may require that ECUs without authentication capability be accommodated until the supply chain is switched over to authenticating ECUs. The non-authenticating ECU may still apply a standard CRC check as specified by CAN bus protocol. The authenticating receiver should contain a list of messages (arbitration IDs) which require authentication. If a non-authenticating ECU attempts to forge a message which requires authentication, the authenticating receiver may detect the missing analog signature and mark the message as unauthorized by stomping on the CRC, thus causing all ECUs 24 to reject the non-authenticated message. Therefore, the non-authenticating ECU may still discard messages which the authenticating receiver marks as unauthorized by corrupting the CRC.

For each CAN bus 25, there may be an authenticating receiver 23 (sometimes called a vehicle security module). Vehicle manufacturers may place multiple authenticating receivers 23 in a gateway module which connects multiple CAN busses 25. The authenticating receiver 23 may perform the following functions.

One may be demodulation. The CAN bus signal may be received and demodulated. A demodulator 31 may convert the analog signal on the CAN message to an input to the ECU identification 32. This input may indicate one or more characteristics of frequency, timing, and modulation type, or all three of the characteristics. Depending upon the analog scheme chosen for the implementation, demodulator 31 may also directly output the number of the transmitting ECUs 24.

Another function may be ECU identification 32. For generality, one may assume that the demodulator 31 outputs characteristics of the demodulated signal that are used by the ECU identification 32 function to determine the ECU identifier. The ECU identifier may be able to output an identity of the transmitting ECU 24 in digital form (e.g., 1, 2, and so on).

Another function may be intrusion detector 33. The intrusion detector 33 function may receive two inputs. The function may accept the ECU identifier from the ECU identification 32 function. It also may accept CAN bus 25 data from the transceiver 27 (typically co-located with demodulator 26). Intrusion detector 33 may use the message identifier (i.e., an arbitration ID) on the message together with the ECU identifier 32 to determine if the message is from an ECU 24 which is authorized to send the message. This determination may be implemented from a lookup table. If the intrusion detection 33 function determines that the transmitting ECU 24 is authorized to transmit the message, then intrusion detection does not necessarily invoke a function of a bit stomper 34. However, if the intrusion detector 33 determines that the transmitting ECU 24 is not authorized to send the message (based upon the message ID), then bit stomper 34 may be activated. Bit stomper 34 may actively drive the signal on the CAN bus 25 to force a CRC error. The CRC error in turn may cause all ECUs 24 on bus 25 to reject the message.

A result of the present system is that an ECU 24 may be prevented from transmitting an unauthorized message that is accepted by other ECUs on bus 25. CAN bus 25 signaling may be described in a context of the modulation scheme which adds an analog component.

Figure 4:
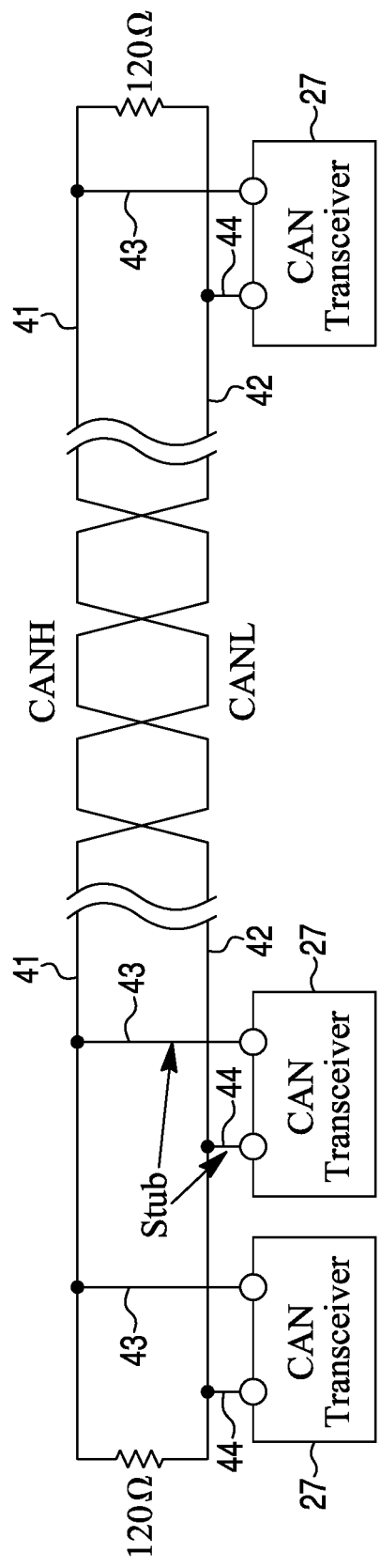
FIG. 4 is a diagram of a bus incorporating a two-wire system.

CAN bus 25 may be a two-wire system as shown in FIG. 4. The two lines 41 and 42 of bus 25 may carry CAN high (H) and CAN low (L) signals, respectively. Bus 25 may be terminated at both ends with 120 ohms across lines 41 and 42. CAN transceivers 27 may be connected across lines 41 and 42 with stubs 43 and 44, respectively.

Figure 5A:
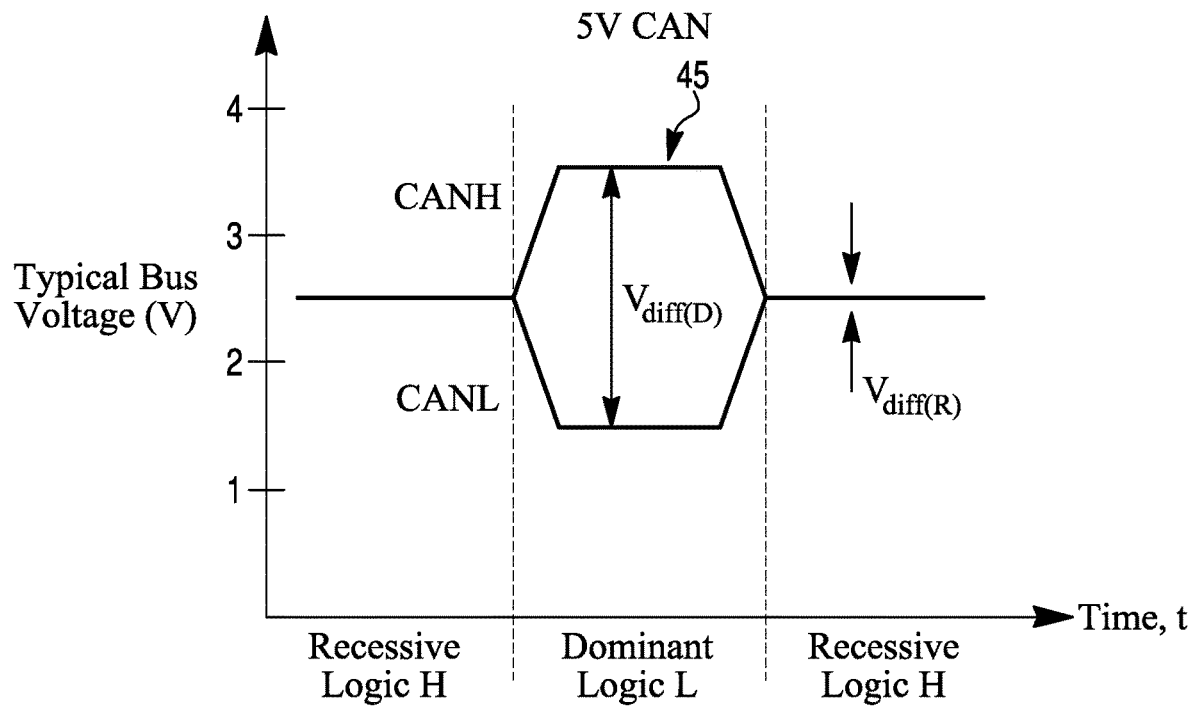
FIGS. 5a and 5b are diagrams of differential signals or voltages on a bus.
Figure 5B:
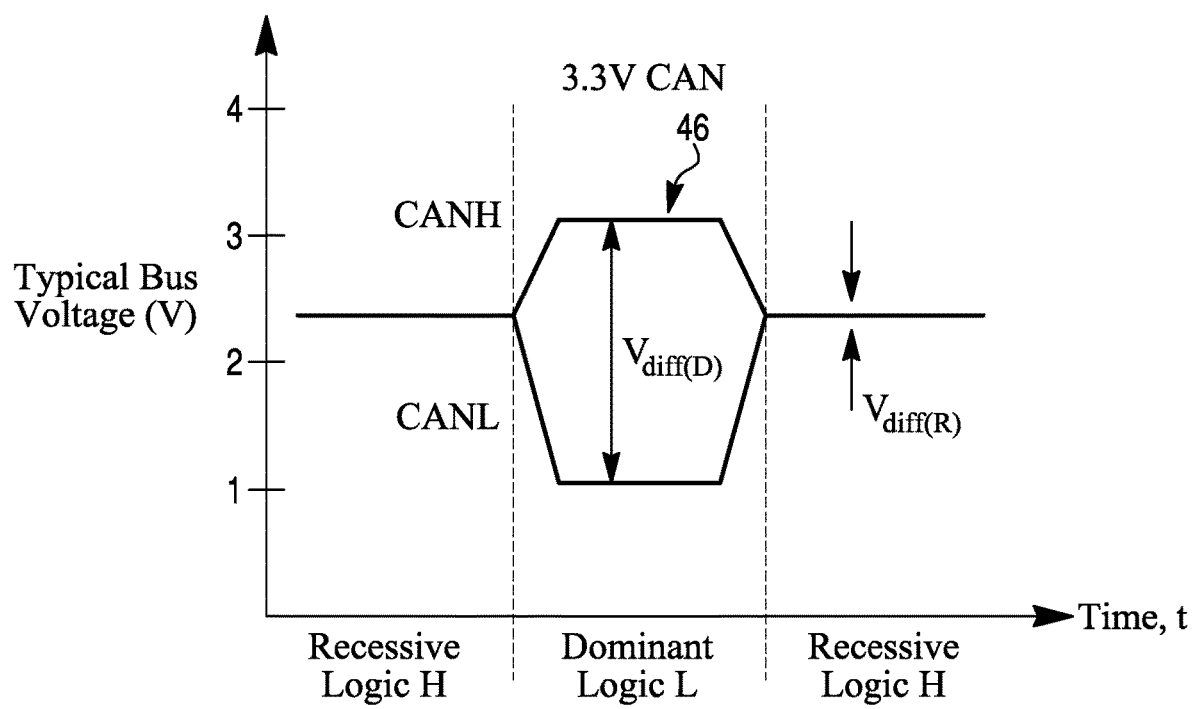

Each of differential signals or voltages 45 and 46 on CAN bus 25 may be a 5V or 3.3 V signal, as shown in FIGS. 5a and 5b, respectively. The signals CANL (CAN-L) and CANH (CAN-H) may have recessive logic H, dominant logic L, recessive logic H, and so on, along a time axis (t) versus typical bias voltage (V).

Figure 6:
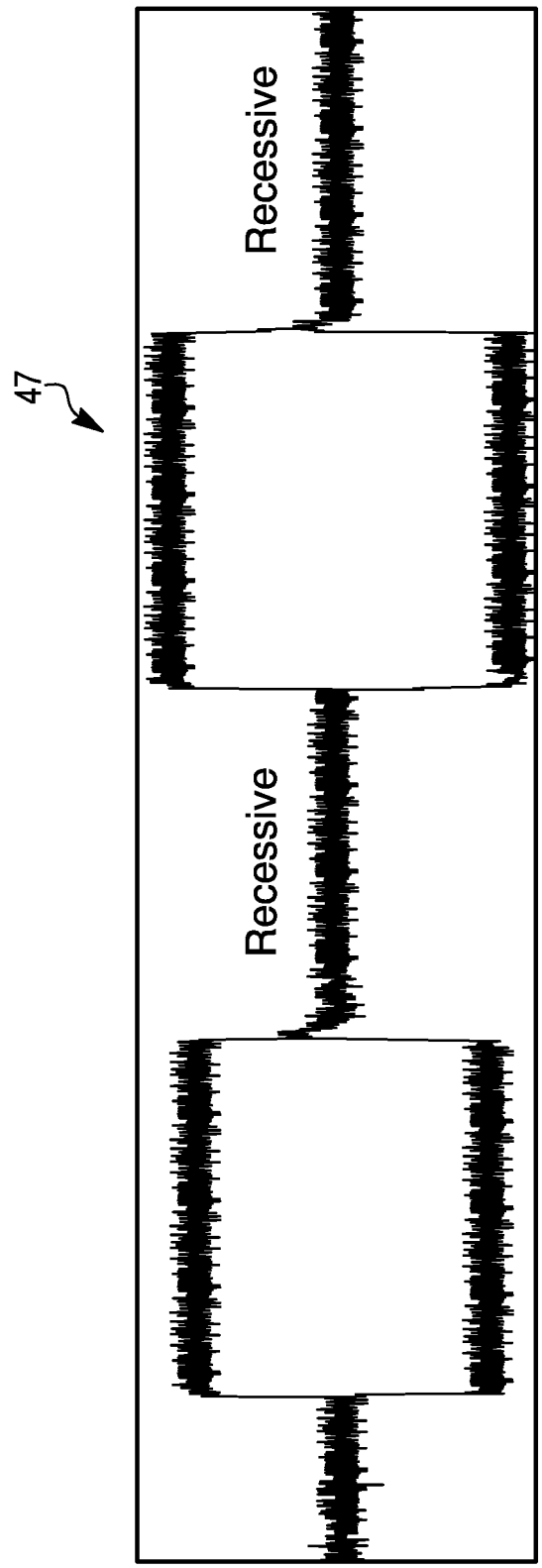
FIG. 6 is a diagram of a raw bus signal waveform without modulation.

FIG. 6 is a diagram of a raw CAN bus signal waveform 47 without modulation. Like that of FIGS. 5a and 5b, the recessive logic H and dominant logic L portions of the waveform are revealed.

Figure 7:
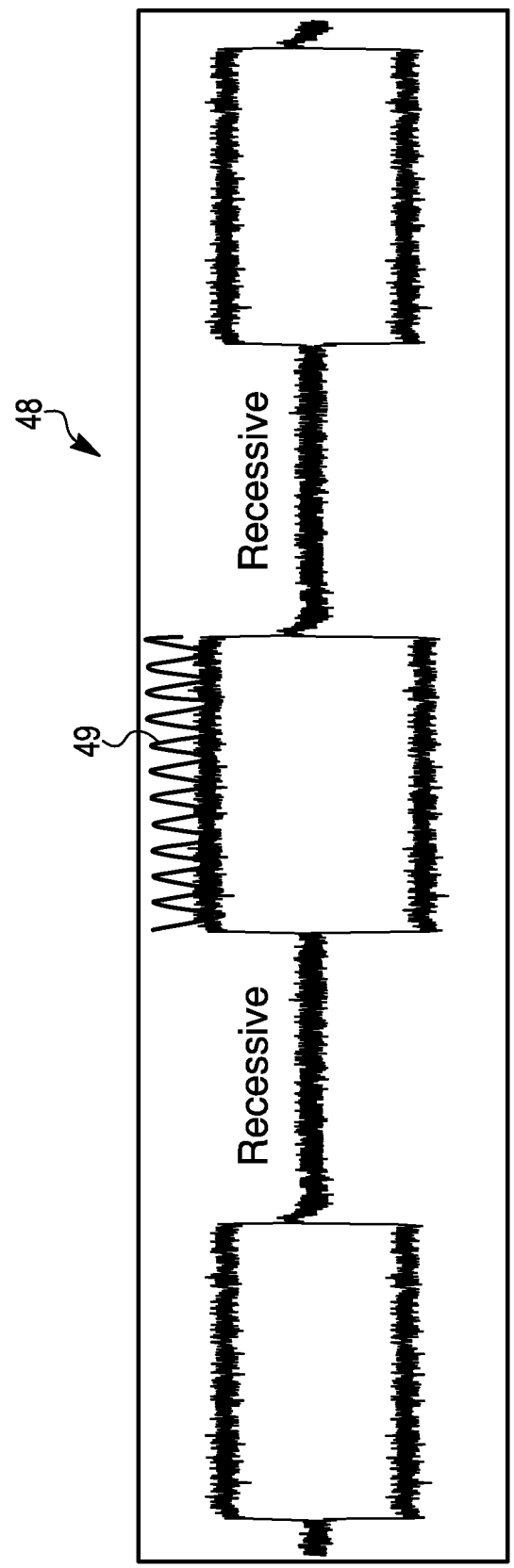
FIG. 7 is a diagram of a representation of a modulated signal.

A representation of the modulated CAN signal (i.e., with an analog signature 49 added) is shown in a waveform 48 in FIG. 7. The modulation does not necessarily have to be applied to every bit. The timing scheme may apply modulation 49 only at specific times. Waveform 48 shows modulation 49 occurring within the dominant portion of the signal. Modulation may also be applied during the recessive portion so long as it is within the noise margins. The modulated signal may still meet the CAN bus signal specifications. One or more modulation types may be selected from a group comprising frequency shift keying (FSK), amplitude shift keying, (ASK) on/off keying (OOK), phase shift keying (PSK), quadrature phase shift keying (QPSK), quadrature amplitude modulation (QAM) and continuous phase modulation (CPM).

The modulator function may be applied in any of four locations. First, the modulator function may be integrated in a CAN bus connector. A modulator chip may be embedded into the CAN bus connector connecting a legacy (i.e., with no modulator capability) ECU to the CAN bus.

Second, the modulator function may be integrated between the CAN wiring harness and the ECU. An additional "modulating connector" may be spliced between the existing CAN connector and the legacy ECU.

Third, the modulator function may be integrated as a chip on the ECU PCB. The modulator function may be implemented on a printed circuit board (PCB) of the ECU outside of the legacy transceiver.

Figure 8:
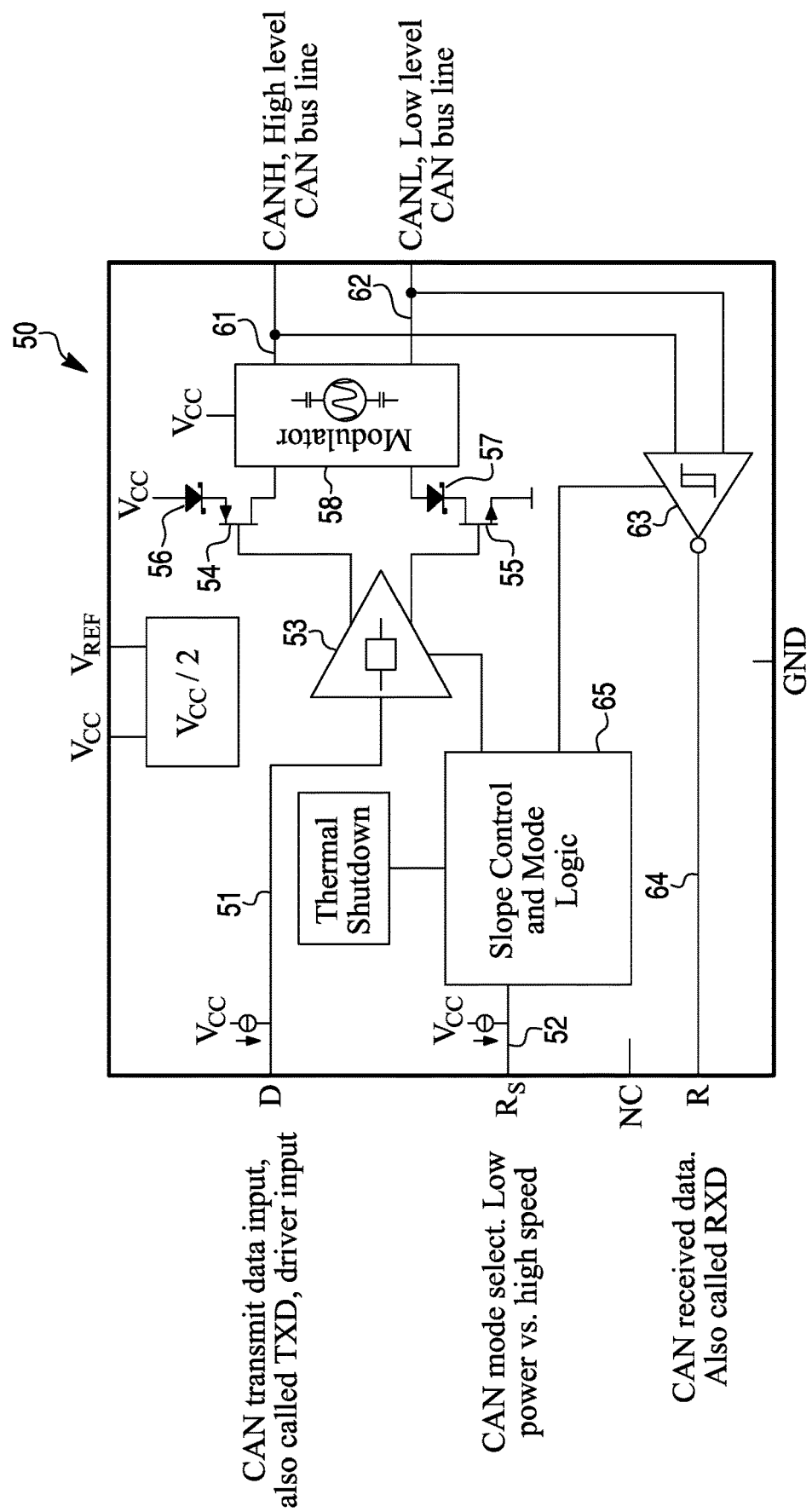
FIG. 8 is a diagram of a modulation scheme integrated within a transceiver on a chip.

Fourth, the modulator function may be integrated into the CAN transceiver. The modulation function may be integrated into the transceiver chip itself. FIG. 8 is a diagram of a modulation scheme integrated within a transceiver 50. The modulation scheme (i.e., the analog signature) may be applicable to both a traditional CAN as well as a newer CAN with a flexible data rate (CAN-FD).

Line 51 may be for a CAN transmit data input, also called TXD, a driver input. Line 52 may be a CAN mode select, low power versus high speed. Line 51 may go to an input of an amp 53 that may provide inverted and non-inverted outputs, first and second outputs, respectively, to a gate of a P-channel FET 54 and to a gate of an N-channel FET 55. FET 54 may have a source connected to a cathode of a Zener diode 56 and a drain connected to a modulator circuit 58. FET 55 may have a drain connected to a cathode of a Zener diode 57 and a source connected to a ground (GND) terminal. An anode of diode 56 may be connected to a voltage supply (Vcc). An anode of diode 57 may be connected to modulator 58. An output 61 from modulator 58 may be a CANH, a high level CAN bus line. An output 62 from modulator 58 may be a CANL, a low level CAN bus line. Outputs 61 and 62 may be connected to a Schmitt trigger 63. An output 64 from trigger 63 may be CAN received data, also called RXD. Input 52 may go to a slope control and mode logic circuit 65, which may have an output to amp 53 and an output to trigger 63.

As to FIG. 3, a simple modulator may be placed in line between an ECU and CAN bus 25. The modulator may deliberately add a signature to a native electrical signal from the ECU. There may be modulator implementation options. It may be part of the wiring harness. It may be a dedicated IC placed after a transceiver 27 or be part of a CAN bus transceiver. Implementation may incorporate programmability at the factory or the field, or not be programmable.

FIG. 9 is a diagram of an electronic control unit fingerprint applied to a Controller Area Network message.

The portions of an ECU fingerprint may incorporate one bit for a Start of Frame (SF) 81, 11 to 29 bits for a message identifier 82, 6 bits for control 83, up to 64 bits for data 84, 16 bits for CRC 85, 2 bits for ACK 86 and 7 bits for End of Frame (EF) 87. The ECU identification may be applied during the transmission of control bits and data bits. The bit stomping could be applied during the transmission of the control, data or CRC bits.

Figure 10:
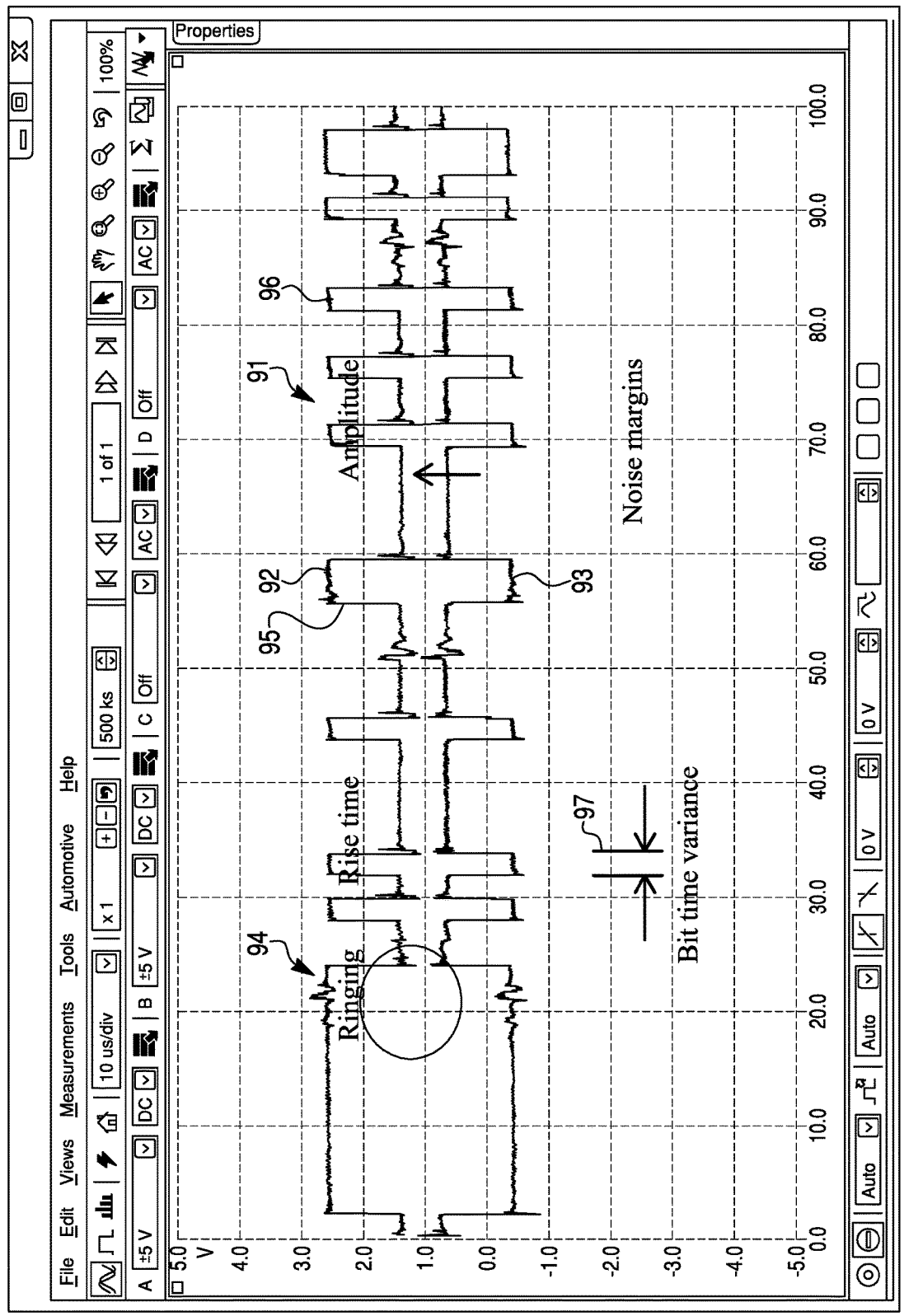
FIG. 10 is a diagram of a controller area unit bus signal on an oscilloscope.

FIG. 10 is a diagram of a CAN bus signal 91 on a scope. Signal 91 may have a differential voltage of a dominant logic L signal at levels 92 and 93, for example. The waveform may reveal ringing 94, rise time 95 amplitude 96 and bit time variance 97 of signal 91.

Figure 11:
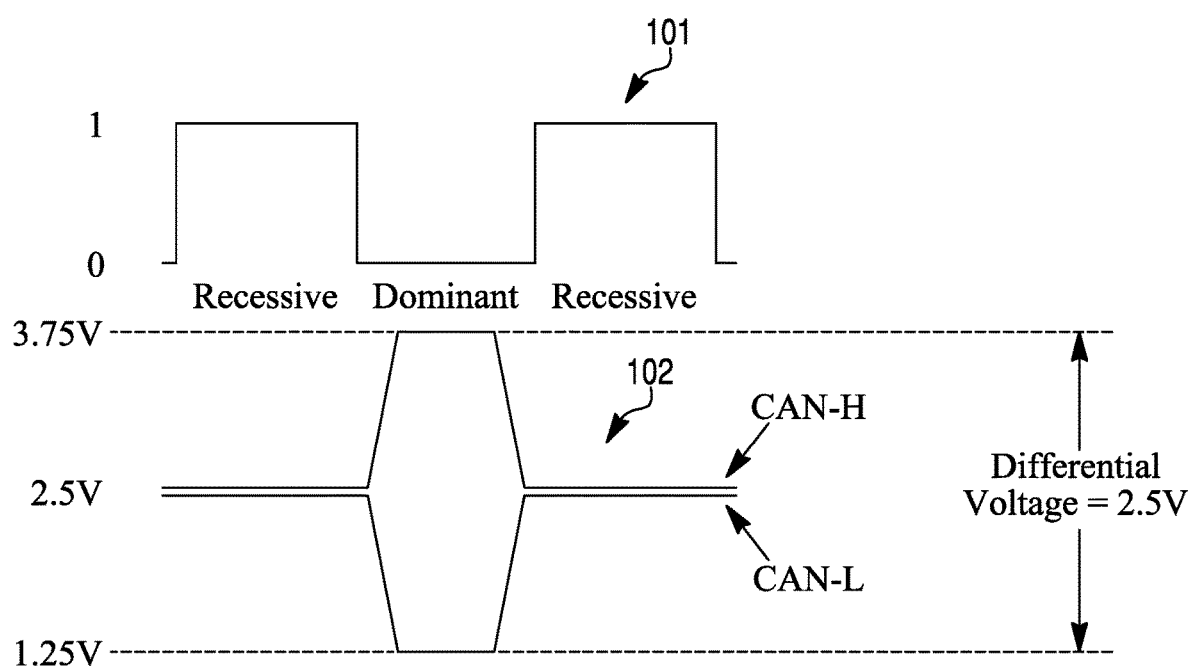
FIG. 11 is a diagram of a waveform having a recessive logic signal and a dominant logic signal.

FIG. 11, like FIGS. 5*a*, 5*b*, 6, 7, and 11, shows a logic signal 101 having a recessive logic "1" signal and dominant logic "0" signal. Corresponding to logic signal 101 are CAN-H and CAN-L signals 102 that have a magnitude of 2.5 volts each or a differential magnitude of about zero volts at the recessive logic H signal. The CAN-H and CAN-L signals 102 have magnitudes of 3.75 volts and 1.25 volts, respectively, and together have a differential magnitude of about 2.5 volts at the dominant logic L signal.

Figure 12:
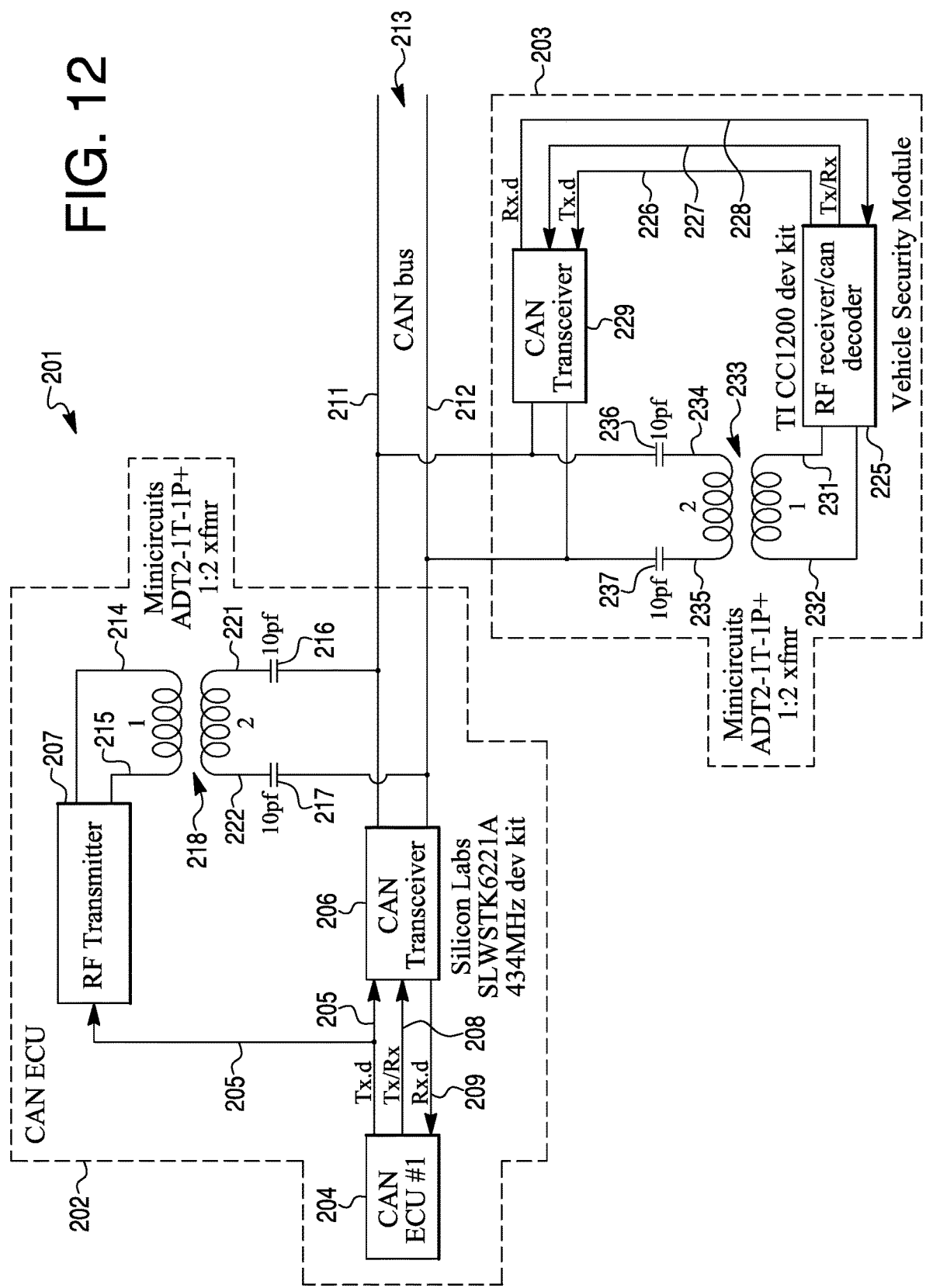
FIG. 12 shows a diagram of a system for authentication of components for allowing transmission of messages.

FIG. 12 shows the block diagram of a demonstration system. The purpose of the system may be to demonstrate that the RF (analog) identification signals and native CAN signals can coexist on the same physical channel (twisted pair). The timing of the transmission, decoding by a vehicle security module and enforcement decision may all be performed within the timing constraints of an operational CAN bus. The system may typically integrate the RF transmission and receiver functions in CAN transceivers in order to reduce cost size and power requirements.

Requirements for classic CAN device authentication transmitter may be noted. The authenticating transmitter may start transmitting an FSK modulated carrier when the device transmitter begins a transmission. Due to delays in responding to a start of transmission indication, this should occur <1-2 uS after the CAN transmission starts.

The message may consist of a packet containing, at a minimum, a sync header and ID number for the CAN ECU. The ID number may be the base CAN ID (11 bit ID) in systems where multiple virtual devices exist in a single ECU.

The data rate for the authentication transmission should be sufficiently fast such that the authentication message is complete well before the shortest CAN message can be transmitted. For a standard rate CAN bus {1 MHz), this may be before the end of the 36th bit of the message (assuming a single 8 bit data field), or 36 microseconds (uS). The design must allow sufficient time for the authenticating receiver to process the message and act upon it.

The authenticating receiver may use a microcontroller or hardware based logic (e.g., a gate array) to accomplish the required calculations within the required time.

Needs for a CAN device authentication receiver may be noted. The authenticating receiver of a vehicle security module (VSM) may listen continuously for transmissions containing analog authenticating transmissions. When a CAN transmission is detected, the message ID may be decoded and compared to the analog ID received, if any. The CAN message ID may be compared against the analog ID to see what types of commands this ECU is allowed to transmit. If this is a valid message for this particular ECU to transmit (i.e., a correct analog ID, allowed command type for this particular ECU), no action is necessarily taken.

If the message from the ECU is not accompanied by a validating analog (RF) transmission with the correct ID number and this ECU is required to be accompanied by a validating analog (RF) transmission, the authenticating receiver should short the bus (assert a dominant 1 bit) for more than 6 bit times before releasing the bus. This should invalidate the bus traffic as this is not necessarily a valid message for this ECU, real or spoofed, to send.

If the message from the ECU is accompanied by a validating analog (RF) transmission with the correct ID number, the authenticating receiver should decode the command field of the message and determine if this device is allowed to transmit this command. If it is not allowed to transmit this command, then the authenticating receiver should short the bus (assert a dominant 1 bit) for more than 6 bit times before releasing the bus. This may invalidate the bus traffic as this is not necessarily a valid message for this ECU, real or spoofed, to send.

If this message is from an ECU that is not required to have an accompanying validating RF transmission, then the authenticating receiver may still need to decode the message and determine if this is a valid command for this ECU to send. If it is not, then the VSM should short the bus (assert a dominant 1 bit) for more than 6 bit times before releasing the bus. This may invalidate the bus traffic as this is not necessarily a valid message for this ECU, real or spoofed, to send.

It may be noted that it is not necessarily needed for all ECU's to have an authenticating analog (FSK) transmission, but all messages from all ECU's should be checked against a list of valid commands for any particular ECU to send.

An analysis for the system may include looking at the timing budget for the sender to apply the electronic control unit (ECU) identifier and for the receiver (policy enforcement) to decode the signal and make a decision whether or not to stomp on the CRC.

FIG. 12 may also be regarded as a diagram of an instance of a present system 201, which may have an ECU module 202 and a vehicle security module 203. In module 202, an ECU (#1) 204, for example, may have an output (Tx.d) 205 connected to a transceiver 206 and an RF transmitter 207. ECU 204 may have another output (Tx/Rx) 208 connected to transceiver 206. An output (Rx.d) 209 from transceiver 206 may go to ECU 204. Transceiver 206 may be a Silicon Labs SLWSTK6221A 434 MHz dev kit. Transceiver 206 may be instead a circuit capable of applying an analog ID signal. Transceiver 206 may be connected to lines 211 and 212 of a bus 213. RF transmitter 207 may have lines 214 and 215 connected to a first winding of a transformer 218. A second winding of transformer 218 may have lines 221 and 222 connected to first terminals of capacitors 216 and 217, respectively. A nominal value of each capacitor may be 10 pf, but it may be another value as desired. Second terminals of capacitors 216 and 217 may be connected to lines 211 and 212, respectively, of bus 213. Transformer 218 may be a Minicircuits ADT2-1T-1P+ 1:2 transformer.

Vehicle security module 203 may have an RF receiver/decoder 225. RF receiver/decoder 225 may be a TI CC1200 dev kit or other model as desired. An output line (Tx.d) 226 and line (Tx/Rx) 227 of RF receiver/decoder 225 may go to a transceiver 229. An output line (Rx.d) 228 may go to receiver/decoder 225. Output lines 231 and 232 may go from receiver/decoder 225 to a first winding of a transformer 233. A model of transformer 233 may be like that of transformer 218. Lines 234 and 235 may go from a second winding of transformer 233 to first terminals of capacitors 236 and 237, respectively. The second terminals of capacitors 336 and 337 may be connected to lines 211 and 212, respectively, of bus 213.

FIG. 13 is a diagram that shows an additional analysis of the transmission of the ECU identification. It may reveal a message packet 105. Bit 107 may be a start of a frame. Bits 102-112 may represent an arbitration field 108. Bit 13 may represent a remote transmitter request 109. Bit 14 may represent an ID extension bit 110. Bit 15 may represent a reserved bit 111. Bits 13-16 may represent an 8 uS (microsecond) Tx start-up 112. Bits 16-19 may represent data length 113. Bits 20-27 represent 8 bit data 114. Bits 28-42 may represent a 15 bit CRC 115. Bits 17-27 may represent a 22 uS transmission 116. Bits 28-36 may represent an 18 uS stomp decision 117. Bit 43 may represent a CRC delimiter 118. Message packet 105 may be run on a CAN bus at 500 kbps.

A message packet 106 may run on a CAN FD at 250 bkbps, which is one-half the speed that packet 105 is run. Bits 15, 17 and 18 may represent flexible data 121, bit rate switch 122 and error status indicator, respectively. Data length 113 may be represented by bits 19-22. Eight-bit data length 114 may be represented by bits 23-30. A seventeen bit CRC 115 may be represented by bits 31-47. CRC delimiter 118 may be represented by bit 48.

A 20 uS mark 125 may occur at bit 10 in packet 105. That may be a 40 uS mark 126 at bit 10 in packet 106. Each bit may be 2 uS in packet 105 and 4 uS in packet 106.

Bus Tx startup 112 may be during bits 12 and 13 in packet 106. An 88 uS transmission 116 may be during bits 14-36. A 20 uS stomp decision 117 may be during bits 37-41. Seven bits 119 may remain after stomp decision 117.

Requirements for a CAN authentication transmitter may be noted. The authenticating transmitter should decode the ECU 10 field while monitoring both the transmitter enable line and transmitter data line on the ECU in order to determine if the ECU to which the ID transmitter is attached has actually taken control of the bus. This may be done by decoding the transmitted address. Normally, a non-bit-stuffed ECU 10 field may be 11 bits in length. Because CAN data is limited to a run length of 5 bits, maximum, this could expand the 10 field to as long as 13 bits if there are two sequences of run length limits in the 10 field. The authenticating RF transmitter should monitor the transmitted 10 field and determine if bit-stuffing has occurred in order to properly determine when the end of the 10 field occurs. If the transmitter is still active after the last bit of the bit-stuffed ID field, then the device may have taken control of the bus and the authenticating transmitter may be engaged to send the RF ID data to the authenticating receiver (VSM).

FIG. 14 is a diagram of a packet 130. Some differences may be apparent when compared to packet 106. Message packet 130 may be run on a CAN at 125 kbps. An 8 uS Tx startup 112 may occur during bit 12, which is the remote Tx request. Transmission time available may occur from bit 13 to about one-fourth way through bit 34. A stomp decision 117 may run from about one-fourth way through bit 34 up to bit 37. Seven bits 119 may remain after bit 36 through bit 43. There may be an 80 uS preamble with 40 symbols beginning at bit 13. There may be a 4 byte sync of 32 uS beginning at bit 22. There also may be an 8 uS data at bit 26 and a 16 uS CRC at bits 29 and 30. There may be a 136 uS verification transmission length beginning at bit 12. A 48 uS stomp decision 117 may begin during bit 31.

FIG. 15 may be a diagram of a timing analysis that shows that the system can perform the needed transmission and decoding in order to prevent a successful transmission of messages from unauthorized sources. RF startup time for CC1200 transition may be from Rx to Tx state (43 uS). Reducing the preamble from 40 to 20 symbols may increase the stomp decision time to 61 uS. This should be more than adequate, even with allowing additional time to initialize the Tx and decode the message in the Rx. One may note that the RF symbol rate is 500 ksps due to using 4(G) FSK transmission to achieve 1 Mbps throughput.

For proof of the present system, the RF components may be implemented outside of the CAN transceiver chip. The proof of concept design for the transmitting ECU is shown herein.

FIG. 15 has the diagram of a packet 135 running on a 125 kbps CAN. After bit 11, there may be a 43 uS Tx startup. The pattern of packet 135 may be the same as packet 130. There may be a 200 uS total time available after bit 11. A 40 uS preamble with 20 symbols may start during bit 17. There may be a 4 byte sync of 32 uS beginning during bit 21. Bus data may occur for about one bit after the sync. A 16 uS CRC may begin during bit 26. A 61 uS stomp decision may occur after the CRC. Seven bits may remain after the stomp decision. A 96 uS verification transmission length may begin during bit 17.

Packet 135 may begin with a start of frame bit 107. An arbitration field 108 may follow bit 107. A Tx start up 112 may run from field 108 to a start of a 20 symbol preamble 136. Sync bits 137 may follow preamble 136 up to data 138. CRC 139 may go from data 138 to a stomp decision 117. If there is no stomp decision, then CRC 139 may continue, including 7 bits remaining 119, to CRC delimiter 118. Bits following Tx start up 112 up to stomp decision 117 may be a verification transmission length 141. Total time available may run from a beginning of Tx start up 112 through stomp decision 117.

Figure 16:
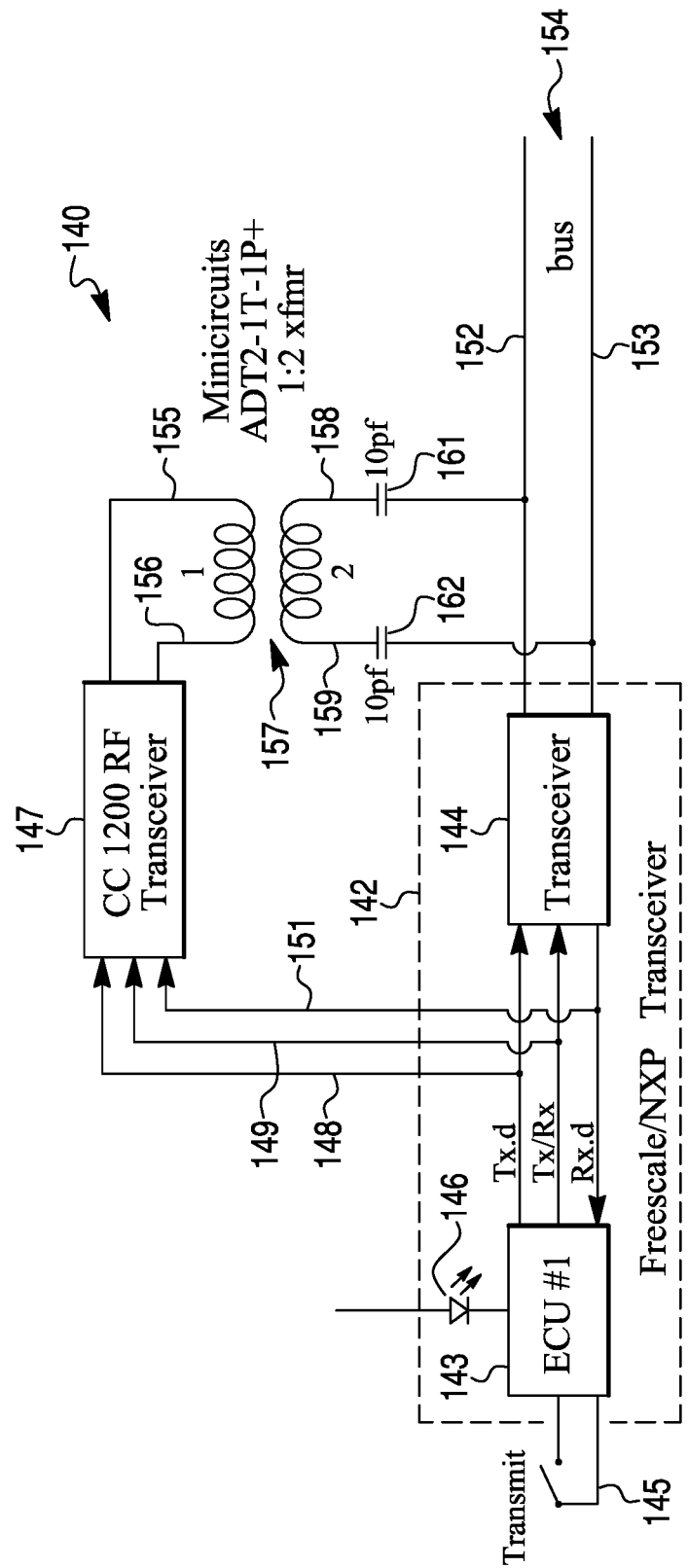
FIG. 16 is a diagram of a transmit portion of an example of the present system.

FIG. 16 is a diagram showing a transmit portion of the system. A chip CC1200 may ideally wake on Tx/Rx->Tx and watch the Tx.d and Rx.d data lines to determine if ECU #1 has: 1) Started to transmit; 2) Captured the bus by comparing the transmitted ID to the received ID in that a mismatch indicates that the bus was not captured; and 3) Finished transmitting the ECU ID field so that a radio can start sending the ECU ID.

A transmission may be initiated by pressing the button attached to the ECU. An LED may light up to indicate that a bus transaction has started. When the ECU has captured the bus and has finished sending its ID, the transceiver may switch from receive to transmit and send out a preamble, sync sequence, the ECU ID #, and the message CRC. This may identify the device originating the transmission and the validity of the transmission may be determined by the vehicle security module.

For our demonstration purposes, a CC1200 need only delay after the start of the transmission because there will be necessarily no devices contending for the bus. A receive function of the RF transceiver can be used only to hold the transmit frequency. This appears necessary to speed up the time from transmitter initiation to actual RF output.

FIG. 16 may also be regarded as a diagram of a transmitting portion 140 of a version of the present system. A freescale/NXP transceiver 142 that may incorporate an ECU 143 and a transceiver 144. ECU 143 may have a transmit button 145 and an LED indicator 146. Transmitting portion 140 may further incorporate a CC 1200 RF transceiver 147. Transceiver 147 may be instead one of several other available models. ECU 143 may have an output (Tx.d) 148 to transceiver 144 and transceiver 147, and an output (Tx/Rx) 149 to transceiver 144 and transceiver 147. Transceiver 144 may have an output (Rx.d) 151 to ECU 143 and transceiver 147. Transceiver 144 may have connections to lines 152 and 153 of a bus 154. Transceiver 147 may have connections to lines 155 and 156 to a first winding of a Minicircuits ADT2-1T-1P+ 1:2 transformer 157. Transformer 157 may be instead one of several available models. A second winding of transformer 157 may be connected to lines 158 and 159, which in turn may be connected to first terminals of capacitors 161 and 162, respectively. The second terminals of capacitors 161 and 162 may be connected to lines 152 and 153, respectively, of bus 154. Nominal values of capacitors 161 and 162 may be 10 pf, or other values as desired.

Figure 17:
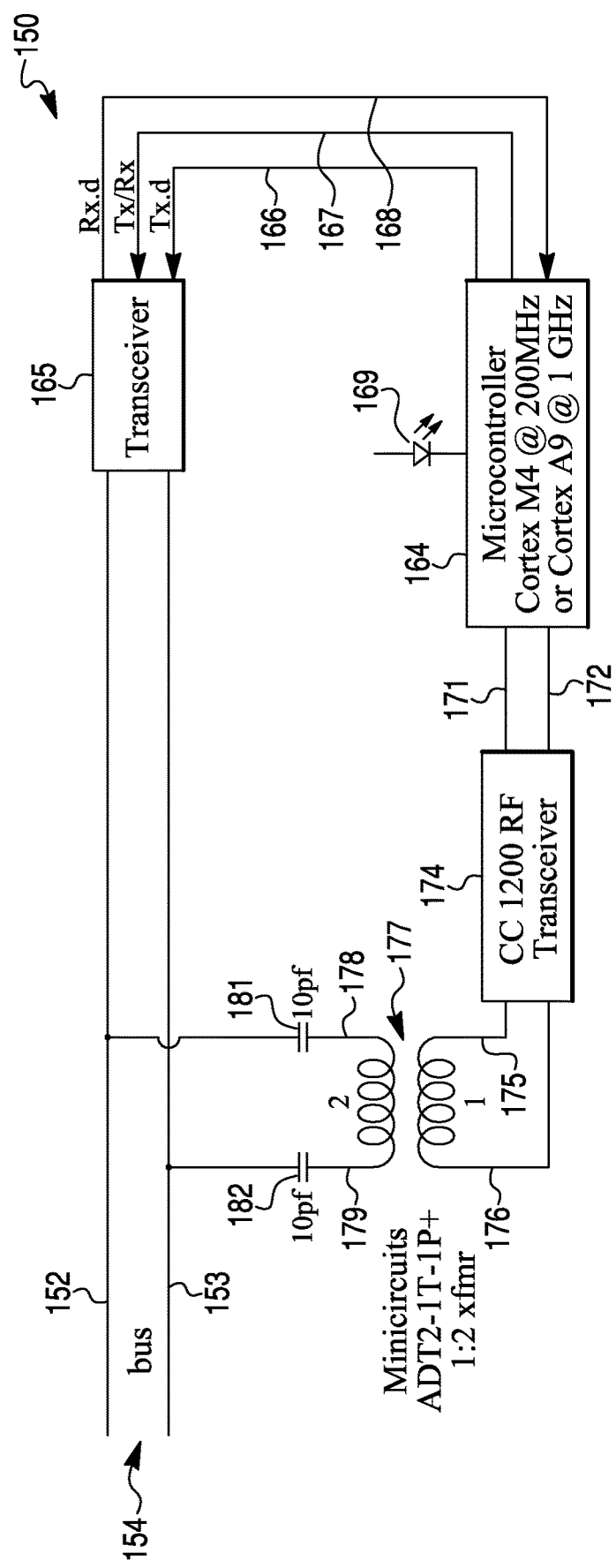
FIG. 17 is a diagram of a receiving portion of an example of the present system.

The receiver (vehicle security module which may perform enforcement) is shown in FIG. 17. The RF receiver components may typically be integrated in the CAN bus transceiver. CC1200 may be virtually always in a receive mode listening for an RF signal on the bus. When the VSM detects bus activity, the microcontroller may decode the bus ID field and wait for a message from the CC1200 indicating that it received data. The microcontroller may retrieve the data and compare the bus address with the ECU ID. The RF ID and the CAN ID may be compared to a table of allowed RF ID and CAN ID pairs. If the table indicates they are allowed to communicate, nothing appears to happen and the microcontroller may go back to sleep. If the table indicates that this is not an allowed transaction, the microcontroller may turn on the CAN transceiver and send out either a 7 byte sequence of solid zeros or a hash of random data to jam the bus and invalidate the transmission.

If no RF appears in the receiver before 200 uS has elapsed, the microcontroller may turn on the CAN transceiver and send out either a 7 byte sequence of solid zeros or a hash of random data to jam the bus and invalidate the transmission. After the 7 byte quash/jam sequence is sent, the VSM may go back to sleep. A red LED may indicates that the VSM has quashed a transmission. A green LED may indicate that an authenticated transmission has occurred. A red LED may indicate that an invalid transmission was detected. The LED indication may be for illustrative purposes.

FIG. 17 may also be regarded as a diagram of a receiving portion 150 of a version of the present system. Portion 150 may be regarded as a vehicle security module. A microcontroller 164 may have an output (Tx.d) 166 to a transceiver 165 and also an output (Tx/Rx) 167 to transceiver 165. Transceiver 165 may have an output (Rx.d) 168 to microcontroller 164. Microcontroller 164 may be a Cortex M4 @ 200 MHz or a Cortex A9 @ 1 GHz. Microcontroller 164 may be one of several other available models.

Microcontroller 164 may have an LED indicator 169. Lines 171 and 172 may connect microcontroller 164 to a CC1200 RF transceiver 174. Transceiver 165 may be connected to lines 152 and 153 of bus 154. Transceiver 174 may have lines 175 and 176 connected to a first winding of a Minicircuits ADT2-1T-1P+ 1:2 transformer 177. Transformer 177 may be instead one of several other available models. A second winding of transformer 177 may be connected to lines 178 and 179, which in turn may be connected to first terminals of capacitors 181 and 182, respectively. The second terminals of capacitors 181 and 182 may be connected to lines 152 and 153, respectively, of bus 154. Nominal values of capacitors 181 and 182 may be 10 pf, or other values as desired.

To recap, an authentication system may incorporate a bus, a transmitter connected to the bus, and a receiver connected to the bus. A physical layer signal may be applied by the transmitter to a message on the bus for authenticating the transmitter. The physical layer signal may incorporate an identifier (ID) of the transmitter. The receiver may receive the message and decode the physical layer signal on the message. A decoding of the physical layer signal on the message may reveal the ID of the transmitter sending the message. The receiver may look up the ID on a list of IDs corresponding to transmitters approved to send the message, to determine whether the ID of the transmitter sending the message matches an ID on the list. If the ID of the transmitter matches an ID on the list, then the transmitter may be authenticated and authorized to send the message.

If the transmitter is authenticated, the message sent by the transmitter that is received by the receiver may be processed by the receiver. If the transmitter cannot be authenticated, then the message sent by the transmitter that is received by the receiver may be blocked and not processed by the receiver.

A message having a physical layer signal, may be received by the receiver without interference to an ability of the receiver to receive and decode another message that is a normal signal digitized data message per a communications standard.

The bus may be a controller area network (CAN). The message may be a CAN message. The CAN message may have a dominant portion and a recessive portion. The physical layer signal may be applied to a dominant portion, a recessive portion, or both a dominant and a recessive portion of the CAN message. Or one or more media may be selected from a group incorporating wired media, optical media, radio frequency media, that may be used singularly or in combination for the system.

The bus may incorporate one or more additional receivers that detect the blocking of the message by the receiver that checks the ID decoded from the physical layer signal on the message from the transmitter and determines that the ID of the transmitter does not match an ID on a list of IDs corresponding to transmitters approved to send the message, and in turn blocks the message.

Only one receiver on the bus needs to receive the message and decode the physical layer signal applied to the message. The system only needs one authenticating receiver because the bit stomping function, together with the CRC allows the authenticating receiver to block other receivers from receiving the message. However, the system may have one or more receivers on the bus which can decode the physical layer signal applied to the message.

The bit stomping function is not necessarily the only way to block an unauthorized message. Having one authenticating receiver which performs bit stomping (invalidating the CRC) may be a cost effective way of implementing the system because one authenticating receiver can block the unauthorized message from all receivers. A system could have two or more authenticating receivers which decode the authentication signal and simply prevent the local node from processing the message, i.e., they do not necessarily do bit stomping to prevent other nodes from receiving the message.

If a transmitter is authorized to transmit a message, the receiver may allow the message to be processed without interfering with the message.

If the transmitter is not authorized to transmit a message, according to an ID check, then the receiver may block a processing of the message by asserting a signal on the bus that causes a cyclic redundancy code (CRC) associated with the message to be corrupted.

One or more nodes on the bus having receivers may detect corruption of the CRC associated with the message and thus may not process the message.

Two or more receivers on the bus may receive and decode a physical layer signal on the message to obtain an ID of the transmitter of the message and determine whether the ID matches an ID on a list of IDs of transmitters authorized to send the message.

If the any one of the two or more receivers determines that the transmitter is authorized to transmit the message, then the any one of the two or more receivers may allow the message to be processed by a local processor. If the any one of the two or more receivers determines that the entity was not authorized to transmit the message, then the any one of the two or more receivers may block a processing of the message by the local processor.

The transmitter may apply a modulated signal to the physical layer signal to code an ID for authentication of the transmitter. One or more modulation types may be selected from a group having frequency shift keying (FSK), amplitude shift keying, (ASK) on/off keying (OOK), phase shift keying (PSK), quadrature phase shift keying (QPSK), quadrature amplitude modulation (QAM) and continuous phase modulation (CPM).

The bus may incorporate one of the following receiver and transmitter combinations of components: one or more authenticating receivers, and one or more authenticating transmitters; one or more authenticating receivers, one or more authenticating transmitters, and one or more non-authenticating receivers; one or more authenticating receivers, one or more authenticating transmitters, and one or more non-authenticating transmitters; one or more authenticating receivers, one or more authenticating transmitters, one or more non-authenticating receivers, and one or more non-authenticating transmitters; only one authenticating receiver and only one authenticating transmitter; only one authenticating receiver, only one authenticating transmitter, and one or more non-authenticating receivers; only one authenticating receiver, only one authenticating transmitter, and one or more non-authenticating transmitters; or only one authenticating receiver, only one authenticating transmitter, one or more non-authenticating receivers, and one or more non-authenticating transmitters.

A receiver and transmitter combination that has components that perform authenticating functions and non-authenticating functions may interoperate in accordance with a security policy applied by one or more authenticating components.

An authentication approach may incorporate applying a physical layer authentication signal to a message to be sent by a transmitter on a bus; decoding an identifier (ID) from the physical layer authentication signal on the message to be received by a receiver on the bus; and looking up the ID on a list of IDs corresponding to transmitters approved to send the message, to determine whether the ID decoded from the physical layer authentication signal matches an ID on the list. If the ID matches an ID on the list, then the message on the bus may be authorized. If the ID matches no ID on the list, then the message on the bus may be unauthorized.

The approach may further incorporate accepting and processing the message on the bus if the message is authorized, and blocking the message on the bus if the message on the bus is unauthorized.

Only one receiver on the bus may receive the message and decode the physical layer authentication signal applied to the message.

A mechanism for authenticating transmissions, may incorporate a transmitting entity, a receiving entity, and a bus connected to the transmitting entity and the receiving entity. A physical layer signal may be applied by the transmitting entity to a message on the bus to authenticate the transmitting entity. The physical layer signal may incorporate an identifier (ID) of the transmitting entity. The receiving entity may receive the message and decode the physical layer signal on the message. A decoding of the physical layer signal on the message may reveal the ID of the transmitting entity sending the message. The receiving entity may look up the ID on a list of IDs corresponding to transmitting entities approved to send the message, to determine whether the ID of the transmitting entity sending the message matches an ID on the list. If the ID of the transmitting entity matches an ID on the list, then the transmitting entity may be authenticated. If the ID of the transmitting entity does not match an ID on the list, then the transmitting entity may be not authenticated.

If the transmitting entity is authenticated, the message sent by the transmitting entity that is received by the receiving entity may be processed by the receiving entity. If the transmitting entity is not authenticated, then the message sent by the transmitting entity that is received by the receiving entity may be blocked and not processed by the receiving entity.

A message having a physical layer signal, may be received by the receiving entity without interference to an ability of the receiving entity to receive and decode another message that is a normal signal digitized data message per a communications standard.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An authentication system comprising:
a bus;
a plurality of transmitters connected to the bus;

an authenticating receiver connected to the bus; and
one or more additional receivers connected to the bus; and
wherein:
physical layer signals are applied by the transmitters to messages on the bus for authenticating a transmitter of the plurality of transmitters that sent a message;
the physical layer signal incorporates an identifier (ID) of the transmitter that sent the message;
each of the transmitters applies a unique modulated analog signal associated with the ID of the transmitter to the physical layer signal to incorporate and encode the ID of the transmitter in the physical layer;
the authenticating receiver receives the message and decodes the physical layer signal on the message;
the decoding of the physical layer signal on the message includes demodulating the unique modulated analog signal to determine the ID of the transmitter sending the message and identifying a message type of the message;
the authenticating receiver looks up the ID of the transmitter on a list of IDs corresponding to transmitters approved to send the message to determine whether the ID of the transmitter sending the message matches an ID on the list and compare a message type of the message to message types authorized to be sent by the transmitter sending the message; and
if the ID of the transmitter matches an ID on the list and the message type is authorized to be sent by the transmitter, then the transmitter is authenticated and authorized to send the message; and
if 1) the ID of the transmitter matches no ID on the list or 2) the ID of the transmitter matches an ID on the list and the transmitter is not authorized to send the message type of the message, then the message on the bus may be unauthorized and the authenticating receiver blocks a processing of the message by the one or more additional receivers by asserting a signal on the bus that causes a code associated with the message to be corrupted.

2. The system of claim 1, wherein:
if the transmitter is authenticated, the message sent by the transmitter that is received by the authenticating receiver is processed by the authenticating receiver; and
if the transmitter cannot be authenticated, then the message sent by the transmitter that is received by the authenticating receiver is blocked and not processed by the receiver.

3. The system of claim 2, wherein the bus comprises one or more additional receivers that detect the blocking of the message by the authenticating receiver that checks the ID decoded from the physical layer signal on the message from the transmitter and determines that the ID of the transmitter does not match an ID on a list of IDs corresponding to transmitters approved to send the message, and in turn blocks the message.

4. The system of claim 1, wherein a message having a physical layer signal, can be received by the authenticating receiver without interference to an ability of the authenticating receiver to receive and decode another message that is a normal signal digitized data message per a communications standard.

5. The system of claim 1, wherein:
the bus is a controller area network (CAN);
the message is a CAN message;
the CAN message has a dominant portion and a recessive portion; and
the physical layer signal is applied to a recessive portion or a dominant and a recessive portion of the CAN message.

6. The system of claim 1, wherein only one receiver on the bus needs to receive the message and decode the physical layer signal applied to the message.

7. The system of claim 1, wherein if a transmitter is authorized to transmit a message, the authenticating receiver allows the message to be processed without interfering with the message.

8. The system of claim 1, wherein:
the code is cyclic redundancy code (CRC); and
the one or more receivers detect corruption of the CRC associated with the message.

9. The system of claim 1, wherein two or more receivers on the bus can receive and decode a physical layer signal on the message to obtain an ID of the transmitter of the message and determine whether the ID matches an ID on a list of IDs of transmitters authorized to send the message.

10. The system of claim 9 wherein:
if the any one of the two or more receivers determines that the transmitter is authorized to transmit the message, then the any one of the two or more receivers will allow the message to be processed by a local processor; and
if the any one of the two or more receivers determines that the transmitter was not authorized to transmit the message, then the any one of the two or more receivers will block a processing of the message by the local processor.

11. The system of claim 1, wherein the bus comprises one of the following receiver and transmitter combinations of components:
one or more authenticating receivers, and one or more authenticating transmitters;
one or more authenticating receivers, one or more authenticating transmitters, and one or more non-authenticating receivers;
one or more authenticating receivers, one or more authenticating transmitters, and one or more non-authenticating transmitters;
one or more authenticating receivers, one or more authenticating transmitters, one or more non-authenticating receivers, and one or more non-authenticating transmitters;
only one authenticating receiver and only one authenticating transmitter;
only one authenticating receiver, only one authenticating transmitter, and one or more non-authenticating receivers;
only one authenticating receiver, only one authenticating transmitter, and one or more non-authenticating transmitters; or
only one authenticating receiver, only one authenticating transmitter, one or more non-authenticating receivers, and one or more non-authenticating transmitters.

12. The system of claim 11, wherein a receiver and transmitter combination that has components that perform authenticating functions and non-authenticating functions interoperate in accordance with a security policy applied by one or more authenticating components.

13. An authentication method comprising:
applying a physical layer authentication signal to a message to be sent by a transmitter on a bus;
the transmitter applying a unique modulated analog signal encoding an identifier (ID) of the transmitter to the physical layer authentication signal;

decoding the physical layer authentication signal on the message to be received by a receiver on the bus, the decoding the physical layer includes demodulating the unique modulated analog signal to determine the ID of the transmitter sending the message and identifying a message type of the message; and looking up the ID of the transmitter on a list of IDs corresponding to transmitters approved to send the message to determine whether the ID decoded from the physical layer authentication signal matches an ID on the list and compare a message type of the message to message types authorized to be sent by the transmitter sending the message; and wherein:

if the ID matches an ID on the list and the message type is authorized to be sent by the transmitter, then the message on the bus is authorized; and if 1) the ID matches no ID on the list or 2) the ID matches an ID on the list and the transmitter is not authorized to send the message type of the message, then the message on the bus is unauthorized and the further comprises blocking a processing of the message by the receiver by asserting a signal on the bus that causes a cyclic redundancy code (CRC) associated with the message to be corrupted.

14. The method of claim 13, further comprising:

accepting and processing the message on the bus if the message is authorized; and blocking the message on the bus if the message on the bus is unauthorized.

15. The method of claim 14, wherein only one receiver on the bus receives the message and decodes the physical layer authentication signal applied to the message.

16. A mechanism for authenticating transmissions, comprising:

a transmitting entity;

an authenticating receiving entity; and a bus connected to the transmitting entity and the authenticating receiving entity;

wherein:

a physical layer signal is applied by the transmitting entity to a message on the bus to authenticate the transmitting entity;

the physical layer signal incorporates an identifier (ID) of the transmitting entity;

the transmitting entity applies a unique modulated analog signal encoding the ID of the transmitting entity to the physical layer signal;

the authenticating receiving entity receives the message and decodes the physical layer signal on the message;

the decoding of the physical layer signal on the message includes demodulating the unique modulated analog signal to determine the ID of the transmitting entity sending the message and identifying a message type of the message;

the authenticating receiving entity looks up the ID of the transmitting entity on a list of IDs corresponding to transmitting entities approved to send the message to determine whether the ID of the transmitting entity sending the message matches an ID on the list and compare a message type of the message to message types authorized to be sent by the transmitter sending the message;

if the ID of the transmitting entity matches an ID on the list and the message type is authorized to be sent by the transmitter, then the transmitting entity is authenticated and authorized to send the message; and if 1) the ID of the transmitting entity does not match an ID on the list or 2) the ID of the transmitting entity matches an ID on the list and the transmitter is not authorized to send the message type of the message, then the transmitting entity is not authenticated and the authenticating receiving entity blocks a processing of the message by one or more additional receiving entities connected to the bus by asserting a signal on the bus that causes a cyclic redundancy code (CRC) associated with the message to be corrupted.

17. The mechanism of claim 16, wherein:

if the transmitting entity is authenticated, the message sent by the transmitting entity that is received by the authenticating receiving entity is processed by the authenticating receiving entity; and if the transmitting entity is not authenticated, then the message sent by the transmitting entity that is received by the authenticating receiving entity is blocked and not processed by the authenticating receiving entity.

18. The mechanism of claim 16, wherein a message having a physical layer signal, can be received by the authenticating receiving entity without interference to an ability of the authenticating receiving entity to receive and decode another message that is a normal signal digitized data message per a communications standard.

* * * * *